(12) United States Patent
Ording et al.

(10) Patent No.: US 9,684,436 B2
(45) Date of Patent: Jun. 20, 2017

(54) USER INTERFACE FOR PROVIDING CONSOLIDATION AND ACCESS

(71) Applicant: Apple Inc., Cupertino, CA (US)

(72) Inventors: Bas Ording, San Francisco, CA (US); Steven P. Jobs, Palo Alto, CA (US); Donald J. Lindsay, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 221 days.

(21) Appl. No.: 14/164,922

(22) Filed: Jan. 27, 2014

(65) Prior Publication Data

US 2014/0143723 A1 May 22, 2014

Related U.S. Application Data

(63) Continuation of application No. 13/252,227, filed on Oct. 4, 2011, now Pat. No. 8,640,044, and a continuation of application No. 13/252,232, filed on Oct. 4, 2011, now Pat. No. 8,640,045, said application No. 13/252,227 is a continuation of application No. 12/410,354, filed on Mar. 24, 2009, now Pat. No.
(Continued)

(51) Int. Cl.
*G06F 3/0484* (2013.01)
*G06F 3/0482* (2013.01)
*G06F 3/0481* (2013.01)

(52) U.S. Cl.
CPC ........ *G06F 3/04842* (2013.01); *G06F 3/0482* (2013.01); *G06F 3/04817* (2013.01); *G06F 2203/04805* (2013.01); *Y10S 715/977* (2013.01)

(58) Field of Classification Search
CPC .......... G06F 3/00; G06F 3/048; G06F 3/0481; G06F 3/0482; G06F 3/0484; G06F 3/0486; G06F 3/0488; G06F 3/04812; G06F 3/04817; G06F 3/04842; G06F 9/4443; H04N 5/44543
See application file for complete search history.

(56) References Cited

U.S. PATENT DOCUMENTS 4,698,525 A 10/1987 Tavana et al.
4,698,625 A 10/1987 Mccaskill et al.
(Continued)

FOREIGN PATENT DOCUMENTS

EP 0476972 A2 3/1992
EP 0575146 A2 12/1993
(Continued)

OTHER PUBLICATIONS

Research Disclosure, "Application document icon", Apr. 1993, Research Disclosure database No. 348071, 2 pages.*
(Continued)

*Primary Examiner* — Xiomar L Bautista
(74) *Attorney, Agent, or Firm* — Morrison & Foerster LLP

(57) ABSTRACT

Methods and systems for providing graphical user interfaces are described. To provide greater access and consolidation to frequently used items in the graphical user interface, a userbar is established which includes a plurality of item representations. To permit a greater number of items to reside in the userbar, a magnification function can be provided which magnifies items within the userbar when they are proximate the cursor associated with the graphical user interface.

21 Claims, 6 Drawing Sheets

Related U.S. Application Data 8,032,843, said application No. 13/252,232 is a continuation of application No. 12/410,354, which is a continuation of application No. 11/892,153, filed on Aug. 20, 2007, now Pat. No. 7,526,738, which is a continuation of application No. 09/467,074, filed on Dec. 20, 1999, now Pat. No. 7,434,177.

(56) References Cited

U.S. PATENT DOCUMENTS

| | | |
|---|---|---|
| 4,755,811 A | 7/1988 | Slavin et al. |
| 4,790,028 A | 12/1988 | Ramage |
| 4,984,152 A | 1/1991 | Muller |
| 5,021,976 A | 6/1991 | Wexelblat et al. |
| 5,027,110 A | 6/1991 | Chang et al. |
| 5,053,758 A | 10/1991 | Cornett et al. |
| 5,075,675 A * | 12/1991 | Barker .............. G06F 3/0481 |
| | | 715/794 |
| 5,119,079 A | 6/1992 | Hube et al. |
| 5,146,556 A | 9/1992 | Hullot et al. |
| 5,155,806 A | 10/1992 | Hoeber et al. |
| 5,201,034 A | 4/1993 | Matsuura et al. |
| 5,276,785 A | 1/1994 | Mackinlay et al. |
| 5,295,243 A | 3/1994 | Robertson et al. |
| 5,333,256 A * | 7/1994 | Green .............. G06F 3/04817 |
| | | 715/772 |
| 5,339,390 A | 8/1994 | Robertson et al. |
| 5,341,466 A | 8/1994 | Perlin et al. |
| 5,359,703 A | 10/1994 | Robertson et al. |
| 5,459,488 A | 10/1995 | Geiser |
| 5,530,796 A | 6/1996 | Wang |
| 5,546,521 A * | 8/1996 | Martinez .............. G06F 9/4446 |
| | | 715/708 |
| 5,546,529 A | 8/1996 | Bowers et al. |
| 5,559,301 A | 9/1996 | Bryan, Jr. et al. |
| 5,564,004 A | 10/1996 | Grossman et al. |
| 5,565,888 A | 10/1996 | Selker |
| 5,579,037 A | 11/1996 | Tahara et al. |
| 5,581,670 A | 12/1996 | Bier et al. |
| 5,588,105 A | 12/1996 | Foster et al. |
| 5,615,384 A | 3/1997 | Allard et al. |
| 5,617,114 A | 4/1997 | Bier et al. |
| 5,619,632 A | 4/1997 | Lamping et al. |
| 5,623,588 A | 4/1997 | Gould |
| 5,638,523 A | 6/1997 | Mullet et al. |
| 5,640,498 A | 6/1997 | Chew |
| 5,644,737 A | 7/1997 | Tuniman et al. |
| 5,644,739 A | 7/1997 | Moursund |
| 5,657,049 A | 8/1997 | Ludolph et al. |
| 5,664,128 A | 9/1997 | Bauer |
| 5,670,984 A | 9/1997 | Robertson et al. |
| 5,678,034 A | 10/1997 | Chew |
| 5,689,287 A | 11/1997 | Mackinlay et al. |
| 5,704,050 A | 12/1997 | Redpath |
| 5,736,974 A | 4/1998 | Selker |
| 5,745,096 A | 4/1998 | Ludolph et al. |
| 5,745,110 A | 4/1998 | Ertemalp |
| 5,748,927 A | 5/1998 | Stein et al. |
| 5,757,358 A | 5/1998 | Osga |
| 5,757,371 A | 5/1998 | Oran et al. |
| 5,764,913 A * | 6/1998 | Jancke .............. G06F 11/328 |
| | | 709/224 |
| 5,786,820 A | 7/1998 | Robertson |
| 5,812,111 A | 9/1998 | Fuji et al. |
| 5,812,805 A | 9/1998 | Kitayama et al. |
| 5,824,933 A | 10/1998 | Gabriel |
| 5,825,348 A | 10/1998 | Ludolph et al. |
| 5,825,357 A | 10/1998 | Malamud et al. |
| 5,872,909 A * | 2/1999 | Wilner .............. G06F 11/0715 |
| | | 714/38.12 |
| 5,877,751 A | 3/1999 | Kanemitsu et al. |
| 5,914,714 A | 6/1999 | Brown |
| 5,914,716 A | 6/1999 | Rubin et al. |
| 5,920,316 A | 7/1999 | Oran et al. |
| 5,943,679 A | 8/1999 | Niles et al. |
| 5,956,021 A | 9/1999 | Kubota et al. |
| 5,956,035 A | 9/1999 | Sciammarella et al. |
| 5,973,694 A | 10/1999 | Steele et al. |
| 5,986,639 A | 11/1999 | Ozawa et al. |
| 6,002,402 A | 12/1999 | Schacher |
| 6,014,138 A | 1/2000 | Cain et al. |
| 6,018,571 A * | 1/2000 | Langlois .............. G06F 3/0481 |
| | | 379/201.02 |
| 6,054,990 A | 4/2000 | Tran |
| 6,072,486 A | 6/2000 | Sheldon et al. |
| 6,073,036 A | 6/2000 | Heikkinen et al. |
| 6,108,003 A * | 8/2000 | Hall, Jr. .............. G06F 3/0481 |
| | | 715/772 |
| 6,112,015 A * | 8/2000 | Planas .............. H04L 41/22 |
| | | 709/220 |
| 6,133,915 A | 10/2000 | Arcuri et al. |
| 6,141,010 A | 10/2000 | Hoyle |
| 6,169,538 B1 | 1/2001 | Nowlan et al. |
| 6,177,941 B1 | 1/2001 | Haynes et al. |
| 6,181,781 B1 * | 1/2001 | Porter .............. H04M 3/533 |
| | | 379/88.12 |
| 6,208,342 B1 | 3/2001 | Mugura et al. |
| 6,232,972 B1 | 5/2001 | Arcuri et al. |
| 6,256,649 B1 | 7/2001 | Mackinlay et al. |
| 6,310,633 B1 | 10/2001 | Graham |
| 6,336,146 B1 * | 1/2002 | Burridge .............. G06F 9/4443 |
| | | 719/310 |
| 6,414,700 B1 | 7/2002 | Kurtenbach et al. |
| 6,456,306 B1 | 9/2002 | Chin et al. |
| 6,469,722 B1 | 10/2002 | Kinoe et al. |
| 6,496,206 B1 | 12/2002 | Mernyk et al. |
| 6,621,532 B1 | 9/2003 | Mandt |
| 6,686,938 B1 | 2/2004 | Jobs et al. |
| 6,774,919 B2 | 8/2004 | Miller et al. |
| 6,883,143 B2 | 4/2005 | Driskell |
| 7,036,087 B1 | 4/2006 | Odom |
| D535,657 S | 1/2007 | Ording |
| 7,185,333 B1 | 2/2007 | Shafron |
| D575,793 S | 8/2008 | Ording |
| 7,434,177 B1 | 10/2008 | Ording et al. |
| 7,526,738 B2 | 4/2009 | Ording et al. |
| D597,099 S | 7/2009 | Ording |
| 8,640,044 B2 | 1/2014 | Ording et al. |
| 8,640,045 B2 | 1/2014 | Ording et al. |
| 8,799,813 B2 | 8/2014 | Jobs et al. |
| 2002/0105504 A1 * | 8/2002 | Toepke .............. G06F 3/04886 |
| | | 345/173 |
| 2003/0058286 A1 | 3/2003 | Dando et al. |
| 2004/0174396 A1 | 9/2004 | Jobs et al. |
| 2005/0251755 A1 | 11/2005 | Mullins, II et al. |
| 2012/0023427 A1 | 1/2012 | Ording et al. |
| 2012/0023434 A1 | 1/2012 | Ording et al. |

FOREIGN PATENT DOCUMENTS

| | | |
|---|---|---|
| EP | 0651543 A2 | 5/1995 |
| EP | 0727730 A2 | 8/1996 |
| EP | 0233995 A2 | 9/1998 |
| EP | 0869425 A2 | 10/1998 |
| EP | 0609030 B1 | 6/1999 |
| JP | 57-041731 A | 3/1982 |
| JP | 59-057336 A | 4/1984 |
| JP | 02-153415 A | 6/1990 |
| JP | 03-113578 A | 5/1991 |
| JP | 05-061633 A | 3/1993 |
| JP | 05-165459 A | 7/1993 |
| JP | 06-274586 A | 9/1994 |
| JP | 07-320051 A | 12/1995 |
| JP | 07-320079 A | 12/1995 |
| JP | 08-016353 A | 1/1996 |
| JP | 08-185265 A | 7/1996 |
| JP | 08-227341 A | 9/1996 |
| JP | 09-251341 A | 9/1997 |
| JP | 10-043387 A | 2/1998 |
| JP | 10-269022 A | 10/1998 |
| JP | 11-272391 A | 10/1999 |

(56) References Cited

FOREIGN PATENT DOCUMENTS

| | | |
|---|---|---|
| JP | 2000-242383 A | 9/2000 |
| WO | WO-94/29788 A1 | 12/1994 |
| WO | WO-98/09270 A1 | 3/1998 |

OTHER PUBLICATIONS

"U.S. Appl. No. 09/467,074, Advisory Action mailed Feb. 10, 2003", 3 pgs.
"U.S. Appl. No. 09/467,074, Appeal Decision mailed Feb. 8 2008", 24 pgs.
"U.S. Appl. No. 09/467,074, Brief for Appellant filed May 24, 2004 to Final Office Action mailed Oct. 23, 2003", 40 pgs.
"U.S. Appl. No. 09/467,074, Brief for Appellant filed Oct. 25, 2004 to Final Office Action mailed Jul. 23, 2004", 37 pgs.
"U.S. Appl. No. 09/467,074, Declaration of Bas Ording with Exhibits A-C dated Nov. 28, 2001", 6 pgs.
"U.S. Appl. No. 09/467,074, Examiner's Answer to Appeal Brief mailed Feb. 9, 2005", 27 pgs.
"U.S. Appl. No. 09/467,074, Examiner's Answer to Appeal Brief mailed Oct. 5, 2005", 26 pgs.
"U.S. Appl. No. 09/467,074, Final Office Action mailed Jul. 23, 2004", 29 pgs.
"U.S. Appl. No. 09/467,074, Final Office Action mailed Sep. 25, 2002", 16 pgs.
"U.S. Appl. No. 09/467,074, Final Office Action mailed Oct. 23, 2003", 20 pgs.
"U.S. Appl. No. 09/467,074, Non Final Office Action mailed Feb. 26, 2002", 14 pgs.
"U.S. Appl. No. 09/467,074, Non Final Office Action mailed Apr. 28, 2003", 21 pgs.
"U.S. Appl. No. 09/467,074, Notice of Allowance mailed May 27, 2008", 7 pgs.
"U.S. Appl. No. 09/467,074, Preliminary Amendment filed Apr. 22, 2003", 5 pgs.
"U.S. Appl. No. 09/467,074, Reply Brief filed Apr. 8, 2005 in response to Examiner's Answer to Appeal Brief mailed Feb. 9, 2005", 4 pgs.
"U.S. Appl. No. 09/467,074, Response filed Jan. 27, 2003 to Final Office Action mailed Sep. 25, 2002", 6 pgs.
"U.S. Appl. No. 09/467,074, Response filed Apr. 8, 2008 to Appeal Decision mailed Feb. 8, 2008", 30 pgs.
"U.S. Appl. No. 09/467,074, Response filed Jun. 26, 2002 to Non Final Office Action mailed Feb. 26, 2002", 22 pgs.
"U.S. Appl. No. 08/487,074, Response filed Jul. 28, 2003 to Non Final Office Action mailed Apr. 28, 2003", 37 pgs.
"U.S. Appl. No. 10/741,598, Response filed Jan. 23, 2013 to Final Office Action mailed Nov. 23, 2012", 8 pgs.
"U.S. Appl. No. 10/741,598, Advisory Action mailed Jan. 25, 2010", 3.pgs.
"U.S. Appl. No. 10/741,598, Advisory Action mailed Feb. 14, 2013", 2 pgs.
"U.S. Appl. No. 10/741,598, Examiner Interview Summary mailed Jan. 26, 2009", 2 pgs.
"U.S. Appl. No. 10/741,598, Examiner Interview Summary mailed Jul. 15, 2013", 3 pgs.
"U.S. Appl. No. 10/741,598, Examiner Interview Summary mailed Oct. 29, 2009", 3 pgs.
"U.S. Appl. No. 10/741,598, Final Office Action mailed Aug. 18, 2009", 9 pgs.
"U.S. Appl. No. 10/741,598, Final Office Action mailed Aug. 21, 2007", 10 pgs.
"U.S. Appl. No. 10/741,598, Final Office Action mailed Sep. 5, 2008", 11 pgs.
"U.S. Appl. No. 10/741,598, Final Office Action mailed Nov. 23, 2012", 11 pgs.
"U.S. Appl. No. 10/741,598, Non Final Office Action mailed Feb. 23, 2009", 9 pgs.
"U.S. Appl. No. 10/741,598, Non Final Office Action mailed Feb. 27, 2008", 10 pgs.
"U.S. Appl. No. 10/741,598, Non Final Office Action mailed Mar. 7, 2007", 9 pgs.
"U.S. Appl. No. 10/741,598, Non Final Office Action mailed Jun. 7, 2013", 12 pgs.
"U.S. Appl. No. 10/741,598, Non Final Office Action mailed Aug. 29, 2011", 7 pgs.
"U.S. Appl. No. 10/741,598, Preliminary Amendment filed Dec. 22, 2003", 7 pgs.
"U.S. Appl. No. 10/741,598, Response filed Feb. 5, 2009 to Final Office Action mailed Sep. 5, 2008", 9 pgs.
"U.S. Appl. No. 10/741,598, Response filed May 26, 2009 to Non Final Office Action mailed Feb. 23, 2009", 9 pgs.
"U.S. Appl. No. 10/741,598, Response filed May 27, 2008 to Non Final Office Action mailed Feb. 27, 2008", 6 pgs.
"U.S. Appl. No. 10/741,598, Response filed Jun. 7, 2007 to Non Final Office Action mailed Mar. 7, 2007", 9 pgs.
"U.S. Appl. No. 10/741,598, Response filed Nov. 28, 2011 to Non Final Office Action mailed Aug. 29, 2011", 14 pgs.
"U.S. Appl. No. 10/741,598, Response filed Dec. 18, 2009 to Final Office Action mailed Aug. 18, 2009", 11 pgs.
"U.S. Appl. No. 10/741,598, Response filed Dec. 20, 2007 to Final Office Action mailed Aug. 21, 2007", 8 pgs.
"U.S. Appl. No. 11/892,153, Notice of Allowance mailed Dec. 16, 2008", 6 pgs.
"U.S. Appl. No. 12/410,354, Applicant's Summary of Examiner Interview filed May 19, 2011", 2 pgs.
"U.S. Appl. No. 12/410,354, Examiner Interview Summary mailed May 17, 2011", 3 pgs.
"U.S. Appl. No. 12/410,354, Non Final Office Action mailed Oct. 27, 2010", 6 pgs.
"U.S. Appl. No. 12/410,354, Non Final Office Action mailed Nov. 17, 2009", 6 pgs.
"U.S. Appl. No. 12/410,354, Notice of Allowance mailed Jun. 3, 2011", 7 pgs
"U.S. Appl. No. 12/410,354, Notice of Allowance mailed Jul. 14, 2010", 4 pgs.
"U.S. Appl. No. 12/410,354, Preliminary Amendment filed Oct. 16, 2009", 6 pgs.
"U.S. Appl. No. 12/410,354, Response filed Apr. 27, 2011 to Non Final Office Action mailed Oct. 27, 2010", 9 pgs.
"U.S. Appl. No. 12/410,354, Response filed May 17, 2010 to Non Final Office Action mailed Nov. 17, 2009", 11 pgs.
"U.S. Appl. No. 13/252,227, Non Final Office Action mailed Apr. 18, 2013", 5 pgs.
"U.S. Appl. No. 13/252,227, Response filed Feb. 7, 2013 to Restriction Requirement mailed Jan. 8, 2013", 8 pgs.
"U.S. Appl. No. 13/252,227, Response filed Jul. 18, 2013 to Non-Final Office Action mailed Apr. 18, 2013", 8 pgs.
"U.S. Appl. No. 13/252,227, Restriction Requirement mailed Jan. 8, 2013", 7 pgs.
"U.S. Appl. No. 13/252,232, Corrected Notice of Allowance mailed Oct. 9, 2013", 5 pgs.
"U.S. Appl. No. 13/252,232, Corrected Notice of Allowance mailed Nov. 4, 2013", 2 pgs.
"U.S. Appl. No. 13/252,232, Non Final Office Action mailed Apr. 25, 2013", 6 pgs.
"U.S. Appl. No. 13/252,232, Notice of Allowance mailed Sep. 25, 2013", 9 pgs.
"U.S. Appl. No. 13/252,232, Response filed Feb. 7, 2013 to Restriction Requirement mailed Jan. 24, 2013", 9 pgs.
"U.S. Appl. No. 13/252,232, Response filed Jul. 24, 2013 to Non-Final Office Action mailed Apr. 25, 2013", 9 pgs.
"U.S. Appl. No. 13/252,232, Restriction Requirement mailed Jan. 24, 2013", 7 pgs.
"European Application Serial No. 00986247.5, Office Action mailed May 29, 2008", 10 pgs.
"European Application Serial No. 00986247.5, Response filed Dec. 3, 2008 to Office Action mailed May 29, 2008", 11 pgs.
"European Application Serial No. 0917601.5, Extended European Search Report mailed Dec. 22, 2009", 10 pgs.

(56) References Cited

OTHER PUBLICATIONS

"European Application Serial No. 0917601.5, Office Action mailed Aug. 12, 2010", 1 pg.
"European Application Serial No. 0917601.5, Response filed Dec. 22, 2010 to Office Action mailed Aug. 12, 2010", 14 pgs.
"European Application Serial No. 09176016.5, Extended European Search Report mailed Dec. 22, 2009", 10 pgs.
"How to Create a Shortcut on the Desktop—Revision 1,3", [online]. (c)2009 Microsoft [archived on May 3, 2009], Retrived from the Internet: <URL: http://web.archive.org/web/20090503042004/http://support.microsoft.com/kb/140443>., (Jan. 19, 2007), 2 pgs.
"International Application Serial No. PCT/US2000/32453, International Preliminary Examination Report mailed Sep. 10, 2002", 9 pgs.
"International Application Serial No. PCT/US2000/32453, International Search Report mailed Jun. 12, 2001", 6 pgs.
"Japanese Application Serial No. 2001-547240, Questioning issued Apr. 5, 2010 and English translation of Examiner's Pre-Review Report", (2010), 4 pgs.
"JP 10-269022A", Patent Abstracts of Japan. vol. 1999, No. 1, (Jan. 29, 1999).
"Magnification Technology", NCIP Staff, [online] Retrieved from the Internet: <URL: http://www2.edc.org.ncip/library/vi/magnifi.htrn>, (1994), 7 pgs.
"Microsoft Internet Explorer 5.0 (Screenshots)", Microsoft, as represented by screen shots Explorer Figures 1-7, (1999), 4 pgs.
"Microsoft Office 2000", (1983-1999), 8 pgs.
Ahlberg, C. et al., "Visual Information Seeking: Tight Coupling Dynamic Query Filters with Starfield Displays", *Human Factors in Computing Systems.* (Apr. 24-28, 1998), 313-480.
Alberg, C. et al., "The Alphaslider: A Compact and Rapid Selector", Human Factors in Computing Systems: Chi94, Boston, Massachusetts, USA, (Apr. 24-28, 1994), 365-371.
Anderson, P., et al., "FRUSTUM: A Novel Distortion-Oriented Display for Demanding Applications", *Proceedings of SPIE—The Interntional Society for Optical Engineering,* vol. 2656, (1996), 150-156.
Baeza-Yates, R., "Visualization of Large Answers in Text Databases", *Proceedings of the Workshopon Advanced Visual Interfaces (AVI '96),* (1996), 101-107.
Barthel, B., et al., "Information Access for Visually Impaired Persons: Do We Still Keep a 'Document' in 'Documentation'?", *IEEE IPCC '95 Proceedings,* (1995), 62-66.
Bederson, B., et al., "Pad++: A Zooming Graphical Interface for Exploring Alternate Interface Physics", *Seventh Annual Symposium on User Interface Software and Technology (UIST '94),* (Nov. 2-4, 1994), 17-26.
Bederson, B., et al., "The Craft of Information Visualization: Readings and Reflections", *The Morgan Kaufmann Series in Interactive Technologies,* Morgan Kaufmann Publishers, San Francisco,CA, (2003), 433 pgs.
Bederson, Benjamin B, "Fisheye Menus", University of Maryland, (1999), 1-12.
Benel, R., et al., "Optimal Size and Spacing of Touch Screen Input Areas", *Human-Computer Interaction—INTERACT '87,* (1987), 581-585.
Beringer, D., "Operator Behavioral Biases Using High-Resolution Touch Input Devices", *Proceedings of the Human Factors Society 33rd Annual Meeting,* (1989), 320-322.
Beringer, D., "Target Size, Location, Sampling Point and Instructional Set: More Effects on Touch Panel Operation", *Proceeding of the Human Factors Society 34th Annual Meeting,* (1990), 375-379.
Bernabei, A., et al., "Graphical I/O Devices for Medical Users", *14th Annual International Conference of the IEEE Engineerinf in Medicine and Biology Society,* (1992), 834-836.
Bier, E. A., et al., "Toolglass and Magic Lenses: The See-Through Interface", *Computer Graphics Proceedings, Annual Conference Series,* (Aug. 1993), 73-80.

Brown, M., "Browsing Graphs Using a Fisheye View", *Proceedings of the INTERACT '93 and CHI '93 Conference on Human Factors in Computing Systems (CHI '93),* (1993), p. 516.
Burger, D., "Improved Access to Computers for the Visually Handicapped: New Prospects and Principles", *IEEE Transactions on Rehabilitation Engineering,* vol. 2, No. 3, (Sep. 1994), 111-118.
Card, S., et al,, "Reading in Information Visualization Using Vision to Think", *The Morgan Kaufmann Series in Interactive Technologies,* (1999), 708 pgs.
Carpendale, et al., "Distortion Viewing Techniques for 3-Dimensional Data", *Proceedings of the 1996 IEEE Symposium on Information Visualization (INFOVIS '96),* (1996), 46-53.
Carpendale, et al., "Extending Distortion Viewing from 2D to 3D", Simon Fraser University, (1997), 42-51.
Carpendale, M. S. T., "3-Dimensional Pliable Surfaces: For the Effective Presentation of Visual Information", *Proceedings of the 8th Annual ACM Symposium on User Interface and Software Technology (UIST '95),* (1995), 11 pgs.
Carpendale, M. S. T., et al., "Extending Distortion Viewing from 2D to 3D", *IEEE Computer Graphics and Applications,* (1997), 42-51.
Carpendale, M. S. T., et al., "Making Distortions Comprehensible", *Proceedings, IEEE Symposium on Visual Languages.* (1997), 36-45.
Courter, Gin!, "Mastering Microsoft Office 2000", Professional Edition, (1999), 10-23.
Eslambolchilar, P, et al., "Making Sense of Fisheye Views", Hamilton Institute., 24 pgs.
Furnas, G., et al., "Effective View Navigation", *Proceedings of the ACM SIGCHI Conference on Human Factors in Computer Systems (CHI '97),* (1997), 367-374.
Furnas, G. W, "Generalized fisheye views", *Proceedings of the SIGCHI Conference on Human Factors in Computing Systems (CHI '86),* (1986), 16-23.
Furnas, G. W, "Generalized Fisheye Views", *Human Factors in Computing Systems (CHI '86), Conference Proceedings,* (1986), 1-8.
Furnas, G., et al., "Space-Scale Diagrams: Understanding Multiscale Interfaces", *Proceedings of the SIGCHI Conference on Human Factors in Computing Systems (CHI '95),* (1995), 234-241.
Furnas, G., "The Fisheye Calendar System", Bellcore Technical Memorandum, (1991), 1-9.
Furnas, G. W., "The Fisheye Calendar System", Internet Citation, [Online]. Retrieved from the Internet: http://www.si.umich.edu/~furnas/Papers/FisheyeCalendarTM.pdf>, (Nov. 19, 1991), 1-9.
Goddard, D., "The latest rev: SQLWindows 4.1", *Data Based Advisor,* vol. 12, No. 5. (May 1994), 2 pgs.
Greenberg, S., "A Fisheye Text Editor for Relaxed-Wysiwis Groupware", *Short Papers: CHI 96, CHI '96 Companion,* Vancouver, BC Canada, (1996), 212-213.
Greenberg, S., et al., "Awareness through Fisheyes Views in Relaxed-WYSIWIS Groupware", *Proceeding of Graphics Interface '96, Canadian Inf. Process Soc.,* Toronto, Ont., Canada, (May 22-24, 1996), 28-38.
Greenberg, S., "Fisheye Text Editor for Relaxed-WYSIWIS Groupware", *Proceedings of the 1996 Conference on Human Factors in Computing Systems, CHI 96,* ACM, New York, NY USA, (Abstract Only), (Apr. 13-13, 1996), 212-213.
Hinckley, K., et al., "A Survey of Design Issues in Spatial Input", *Proceedings of the 7th Annual ACM Symposium on User Interface Software and Technology (UIST '94),* (Nov. 2-4, 1994), 213-222.
Kamba, T., et al., "Using Small Screen Space More Efficiently", *Proceedings of the SIGCHI Conference on Human Factors in ComputerSystems (CHI '96),* (1996), 383-390.
Keahey, T., et al., "Non-Linear Image Magnification", Technical Report TR460, (1996), 1-11.
Keahey, T., et al., "Nonlinear Magnification Fields", *Proceedings of the 1997 IEEE Symposium on Information Visualization (InfoVis '97),* (1997), 1-12.
Keahey, T. A., et al., "Techniques for Non-Linear Magnification Transformations", *Proceedings of the 1996 IEEE Symposium on Information Visualization (INFOVIS '96),* (1996), 38-45.
Keahey, T., et al., "Viewing Text With Non-Linear Magnification: An Experimental Study", Technical Report 459, Department of Computer Science, Indiana University, (1996), 1-9.

(56) References Cited

OTHER PUBLICATIONS

Kline, R, et al., "UnWindows 1.0: X Windows Tools for Low Vision Users", *ACM SIGCAPH Computers and the Physucally Handicapped*, vol. 49, (1994), 1-5.

Kline, R., et al., "Improving GUI Accessibility for People with Low Vision", *Proceedings of the SIGCHI Conference on Human Factors in Computing Systems—ACM*, (1995), 114-121.

Lamping, J., et al., "Laying out and Visualizing Large Trees Using a Hyperbolic Space", *Proceedings of the 7th Annual ACM Symposium on User Interface Software and Technology (UIST '94)*, (1994), 13-14.

Lazzaro, J, "Adapting desktop computers to meet the needs of disabled workers is easier than you might think", *BYTE Magazine*, No. 144, (Jun. 1993), 5 pgs.

Leahy, M, et al., "Effect of Touch Screen Target Location on User Accuracy", *Proceedings of the Human Factors Society 34th Annual Meeting*, (1990), 370-374.

Leung, Y., et al., "A Review and Taxonomy of Distortion-Oriented Presentation Techniques", *ACM Transactions on Computer-Human Interaction*, vol. 1, No. 2., (Jun. 1994), 126-160

Lieberman, H., "A Multi-Scale, Multi-Layer, Translucent Virtual Space", *Proceedings, 1997 IEEE Conference on Information Visualization*, (1997), 124-131.

Lieberman, H., "Powers of Ten Thousand; Navigating in Large Information Spaces", *Proceedings of the 7th Annual ACM Symposium on User Interface Software Technology (UIST '94)*, (1994), 15-16.

MacKinlay, J., et al., "The Perspective Wall: Detail and Context Smoothly Integrated", *Proceedings of the SIGCHI Conference on Human Factors in Computing Science (CHI '91)*, (1991), 173-176.

Milner, N., "A Review of Human Performance and Preferences with Different Input Devices to Computer Systems", *Proceedings of the Fourth Conference of the British Computer Society on People and Computers IV*, (1988), 341-362.

Myers, Brad A. "A Taxonomy of Window Manager User Interfaces", *IEEE Computer Graphics and Applications*, (Sep. 1988), 20 pgs.

Noik, E., "Layout-independent Fisheye Views of Nested Graphs", *IEEE Symposium on Visual Languages (VL '93)*, (1993), 336-341.

Okazaki, T., et al., "Multi-Fisheye Distortion of the Network Map", *IEICE Transactions on Computers*. vol. E78-B, (Abstract Only), (1995), 61-67

Okazaki, T., et al., "Multi-Fisheye Transformation Method for Large-Scale Network Maps", *NTT*, vol. 44, Issue 6, (Abstract Only), (1995), 495-500.

Okazaki, T., et al., "Multi-Fisheye Transformation Method for Large-Scale Network Maps", *NTT*, vol. 44, Issue 6, (1995), 25-30.

Pickering, J., "Touch-Sensitive Screens: The Technologies and Their Application", *Int. J. Man-Machine Studies*, vol. 25, (1986), 249-269.

Plaisant, C., et al., "Touchscreen Interfaces for Alphanumeric Data Entry", *Human Factors Perspectives on Human-Computer Interaction*, (1995), 261-265.

Potter, R., et al., "An Experimental Evaluation of Three Touch Screen Strategies within a Hypertext Database", *International Journal of Human-Computer Interaction*, vol. 1, No. 1, (1989), 41-52.

Potter, R., et al., "Improving the Accuracy of Touch Screens: An Experimental Evaluation of Three Strategies", *Proceedings of the SIGCHI Conference on Human Factors in Computing Systems (CHI '88)*, (1998), 27-32.

Rao, R., et al., "Exploring Large Tables with the Table Lens", *Proceeding Conference Companion on Human Factors in Computing Systems (CHI '95)*, (1995), 403-404.

Rao, R., et al., "The Table Lens: Merging Graphical and Symbolic Representations in an interactive Focus-Context Visualization for Tabular Information", *Proceedings of the ACM SIGCHI Conference on Human Factors in Computing Systems*, (Apr. 1994), 1-7.

Ren, X., et al., "Efficient Strategies for Selecting Small Targets on Pen-Based Systems: An Evaluation Experiment for Selection Strategies and Strategy Classifications", *Proceedings of the IFIP TC2/TC13 WG2.7/WG13.4 Seventh Working Conference on Engineering for Human-Computer Interaction*, (1999), 19-37.

Ren, X., et al., "Improving Selection Performance on Pen-Based Systems: A Study of Pen-Based Interaction for Selection Tasks", *ACM Transactions on Computer-Human Interaction*, vol. 7, No. 3, (Sep. 2000), 384-416.

Ren, X., et al., "The Best among Six Strategies for Selecting a Minute Target and the Determination of the Minute Maximum Size of the Targets on a Pen-Based Computer", *Human-Computer Interaction: INTERACT'97*, (1997), 85-92.

Riecken, R., "Adaptive Direct Manipulation", *Proceedings, IEEE International Conference on Systems, Man, and Cybernetics*, (1991), 1115-1120.

Robertson, G., et al., "Information Visualization Using 3D Interactive Animation—The Next Generation Guis", *Communication of the ACM*, vol. 36, No, 4, (1993), 57-71

Robertson, G., et al., "The Document Lens", *Proceedings of the 6th Annual ACM Symposium on User Interface Software and Technology (UIST '93)*, (1993), 101-108.

Rosner, P., et al., "In Touch: A Graphical User Nterface Development Tool", *Software Tools for Interface Design, IEEE Colloquium*, (1990), 12/1-12/7.

Sarkar, M., et al., "Graphical Fisheye Views", *Communications of the ACM*, vol. 37, No. 12, (Dec. 1994), 73-84.

Sarkar, M., et al., "Graphical Fisheye Views of Graphs", *Proceedings of the SIGCHI Conference on Human Factors in Computing Systems (CHI '92)*, (1992), 83-91.

Sarkar, M., et al,, "Graphical Fisheye Views of Graphs", Issue 84., © Digital Equipment Corporation 1992, (Mar, 17, 1992), 1-24.

Sarkar, M., et al., "Stretching the Rubber Sheet: A Metaphor for Viewing Large Layouts on Small Screens", *Proceedings of the 6th Annual ACM Symposium on User Interface Software and Technology (UIST '93)*, (1993), 81-91.

Schaffer, D., et al., "Navigating Hierarchically Clustered Networks through Fisheye and Full-Zoom Methods", *ACM Transactions on Computer-Human Interaction*, vol. 3, No. 2, (Jun. 1996), 162-188.

Scott, B., et al., "Designing Touch Screen Numeric Keypads: Effects of Finger Size, Key Size, and Key Spacing", *Proceeding of the Human Factors and Ergonomics Society 41st Annual Meeting*, (1997), 360-364.

Sears, A., et al., *Advances in Human-Computer Interaction*, vol. 3, Ablex Publishing Corp. (1992), 1-33,105-183.

Sears, A., et al., "Chapter 1—A New Era for High Precision Touchscreens", *In: Advances in Human-Computer Int. 3*, (1992), 38 pgs.

Sears, A., et al., "High Precision Touchscreens: Design Strategies and Comparisons with a Mouse", *Int. J. Man-Machine Studies*, vol. 34, (1991), 593-613.

Sears, A., et al., "Investigating Touchscreen Typing: The Effect of Keyboard Size on Typing Speed", *Behaviour & Information Technology*, vol. 12, No. 1, (1993), 17-22.

Sheelagh, M., et al., "3-Dimensional Pliable Surfaces: For the Effective Presentation of Visual Information", *Proceedings of the 8th Annual ACM Symposium on User Interface and Software Technology (UIST '95)*, (1995), 11 pgs.

Shneiderman, B., *Designing the User Interface: Strategies for Effective Human-Computer Interaction—Second Edition*, Addison-Wesley Publishing Company, Inc, (1992), 598 pgs.

Shneiderman, B., *Designing the User Interface: Strategies for Effective Human-Computer Interaction—Third Edition*, Addison-Wesley Publishing Company, Inc, (1998), 669 pgs.

Shneiderman, B., "Direct Manipulation for Comprehensible, Predictable and Controllable User Interfaces", *Proceedings of the 2nd International Conference on Intelligent User Interfaces*, (1997), 33-39.

Shneiderman, B., *Sparks of Innovation in Human-Computer Interaction*, Ablex Publishing Corporation, New Jersey, USA, (1993), 133 pgs.

Shneiderman. B., et al., "The Eyes Have It: A Task by Data Type Taxonomy for Information Visualization", *Proceeding of the 1996 IEEE Symposium on Visual Language (VL '96)*, (1996), 336-343.

(56) References Cited

OTHER PUBLICATIONS

Shneiderman, B., "Touch Screens Now Offer Compelling Uses", *Interface: Tools, Techniques, and Concepts to Optimize User Interfaces,* (Mar. 1991), 93-94.
Shneiderman, B., *Designing the User Interface,* Addison Wesley Longman Inc., Third Edition, (1998), 462-465,534-539.
Simkovitz, D., "LP-DOS Magnifies the PC Screen", *Proceedings of the John Hopkins National Search for Computing Applications to Assist Persons with Disabilities,* (1992), 203-204.
Simpson, Alan, "Windows 95 Uncut", IDG Books Worldwide, Inc., Foster City, CA., (1995), 386-402.
Smith, R., et al., "Relating Distortion to Performance in Distortion Oriented Displays", Proceedings, *Sixth Australian Conference on Computer-Human Interaction,* (1996), 6-11.
Smith, Ray, et al., "Relating Distortion to Performance in Distortion Oriented Displays", Gippsland School of Computing an Information Technology, Monash University, (1996), 6-11.
Steinberg, S, "The New Yorker", [online]. Retrieved from the Internet: <http://www.thenewyorkerstore.com/product_details.asp?mscssid=OSMEJUPRK45U9L4NVXPRXUUK84490B66&sitetype=1&did=5&sid=50326&pid=&keyword=steinberg&section=covers&title=undefined&whichpage=1&sortBy=popular>, (Mar. 29, 1976), 1 pg.
Stone, M., "The Movable Filter as a User Interface Tool", *Human Factors in Computing Systems: CHI '94, CHI 94-4/94,* (1994), 306-312.
Su, J., et al., "A Review of Supernova Screen Magnification Program for Windows", *Journal of Visual Impairment & Blindness,* (Feb. 1999), 108-110.
Su, J., "A Review of Telesensory's Vista PCI Screen Magnification System", *Journal of Visual Impairment & Blindness,* vol. 92, No. 10, (Oct. 1998), 706-710.
Su, J., et al. "A Review of ZoomText Xtra Screen Magnification Program for Windows 95", *Journal of Visual Impairment & Blindness,* (Feb. 1998), 116-119.
Uslan, M., et al., "A Review of Henter-Joyce's MAGic for Windows NT", *Journal of Visual Impairment & Blindness,* (Dec. 1999), 666-668.
Uslan, M., et al., "A Review of Two Screen Magnification Programs for Windows 95: Magnum 95 and LP-Windows", *Journal of Visual Impairment & Blindness,* (Oct. 1997), 9-13.
Vogel, D., et al., "Shift: A Technique for Operation Pen-Based Interfaces Using Touch", *CHI 2007 Proceedings—Mobile Interaction Techniques I,* (2007), 657-666.
Ware, C., et al., "The DragMag Image Magnifier", *Proceeding,Conference Companion on Human Factors in Computing Systems (CHI '95),* (1995), 407-408.
"U.S. Appl. No. 10/741,598, Decision on Pre-Appeal Brief mailed Mar. 19, 2014", 2 pgs.
"U.S. Appl. No. 10/741,598, Final Office Action mailed Nov 18, 2013", 13 pgs.
"U.S. Appl. No. 10/741,598, Notice of Allowance mailed Apr. 2, 2014", 8 pgs.
"U.S. Appl. No. 10/741,598, Pre-Appeal Request for Review filed Feb. 19, 2014", 5 pgs.
"U.S. Appl. No. 10/741,598, Response filed Sep. 9, 2013 to Non Final Office Action mailed Jun. 7, 2013", 10 pgs.
"U.S. Appl. No. 13/252,227, Notice of Allowability mailed Nov. 12, 2013", 2 pgs.
"U.S. Appl. No. 13/252,227, Notice of Allowance mailed Sep. 25, 2013", 9 pgs.
U.S. Appl. No. 29/168,294, filed Jan. 4, 2000, User Interface for Computer Display.

* cited by examiner

USER INTERFACE FOR PROVIDING CONSOLIDATION AND ACCESS

CROSS REFERENCE TO RELATED APPLICATIONS

This is a continuation of application Ser. No. 13/252,232, and also a continuation of application Ser. No. 13/252,227, filed concurrently on Oct. 4, 2011, which are continuations of application Ser. No. 12/410,354, filed Mar. 24, 2009, now U.S. Pat. No. 8,032,843, issued Oct. 4, 2011, which is a continuation of application Ser. No. 11/892,153, filed Aug. 20, 2007, now U.S. Pat. No. 7,526,738, issued Apr. 28, 2009, which is a continuation of application Ser. No. 09/467,074, filed Dec. 20, 1999. Now U.S. Pat. No. 7,434,177, issued Oct. 7, 2008, the benefit of priority of each of which is claimed hereby, and each of which are incorporated by reference herein in its entirety.

BACKGROUND

The present invention relates generally to graphical user interfaces for computer systems. More particularly, the present invention relates to systems and methods for interfacing applications and operating systems which provide for flexible customization of graphical user interfaces.

The evolution of the computer industry is unparalleled in its rate of growth and complexity. Personal computers, for example, which began as little more than feeble calculators with limited memory, tape-driven input and monochrome displays are now able to tackle almost any data processing task. While this meteoric increase in power was almost sufficient to satisfy the demand of application designers and end users alike, the corresponding increase in complexity created an ease-of-use problem which the industry was somewhat slower in solving. Thus, designers were faced with a new challenge: to harness this computing power in a form usable by even those with relatively little computer training to smooth the transition of other industries into a computer-based information paradigm.

As a result, in the early to mid-1980's many new I/O philosophies, such as "user friendly", "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is commonly referred to as a graphical user interface (GUI).

The success of this type of interface is evident from the number of companies which have emulated the desktop environment. Even successful concepts, however, must continually be improved in order to keep pace with the rapid growth in this industry. The advent of multimedia, especially CD-ROM devices, has provided vast quantities of secondary storage which have been used to provide video capabilities, e.g., live animation and video clips, as regular components of application displays. With these and other new resources at their disposal, application designers and users alike, demand additional functionality and greater ease of use from the desktop environment.

To consider the challenges associated with continuing GUI design, consider as an example of a GUI which has evolved over time the Finder™ user interface and information management system (simply "Finder™ user interface" hereafter) which runs on the Apple Macintosh™ computer. The Finder™ user interface is based on the aforedescribed display principles using "windows" and "icons" to help manage computer information. The main or root window is called the "desktop" area, or more generally the primary display region. The desktop, or primary display region, is always open (displayed on the screen with its contents accessible or at least partially accessible), and takes up substantially the fall display screen area when other windows are not open. The desktop is usually visible in the background when other windows are open.

Existing inside any particular window, including the desktop itself, are other information identifiers called "icons." An icon is a screen identifier associated with a particular collection of computer information. Typically an icon may represent a "file" which is either a collection of data or a program or program segment. An icon also may represent the closed state of a window. Icons are graphic images displayed on the computer screen and usually correspond to the type of information stored within the file. Icons give the user access to the particular file represented by the graphic image when the icon is visible. The use of icons and windows is well known in the art.

The "file" is the information packet that the user wishes to utilize, create or modify; each particular file has an associated name identifying the file. Therefore, any given file may be located in the information management system by knowing a file name, an iconographic representation associated with the name, or a window locator name. All information (files) situated within a particular window are identified with that particular window's own identification location within the computer information management system. Therefore, any particular file information can be retrieved knowing its particular identification name and its window name. Accordingly, the resulting screen display utilizing the Finder™ user interface may be broken down into multiple windows and graphic icons.

Another important element of this (and other) conventional user interfaces is a screen cursor. The cursor allows direct user control over the user interface as described above. The Finder™ user interface is complemented with a "mouse" and a corresponding "pointer" which makes up the cursor control device. The user has control over the mouse, which is an electro-mechanical device that translates two-dimensional mouse movement into a two-dimensional screen position movement represented by, for example, a pointer or arrowhead. The user contacts and directs the mouse. When the mouse is moved freely on a table top, then the pointer on the screen will move in a similar and proportional manner. The mouse also contains one or more push buttons which can be used to effectuate control over the cursor pointer by selecting or deselecting specific icons or other display tools. It is said that the cursor pointer is "activated" when the mouse button is depressed and the pointer remains active until the button is released. Pointer activation may also be initiated by sequences of mouse button presses, such as a "double click" interaction which involves rapidly pressing the mouse button press twice in sequence.

Access to information in a conventional user interface system for a display management system is therefore based on windows, icons and pointer movement of the cursor. To access a file, the cursor pointer is placed on the visible icon or visible file name and the pointer is activated. A closed window may be represented by an icon or a window name. A window opens when the pointer of the cursor rests on the visible icon or visible name representing the closed state of the window and the pointer is activated. Within the open window, files may be displayed by icon or by name. An open window, of various geometries, may be rectangular and will exist within the display area of the main viewing screen on the desktop. Multiple windows may be open at one time, typically with the most foreground window corresponding to the most recently opened window and the background windows representing those opened previously. In the organization scheme described, it is appreciated that files are nested within windows and windows can be nested within other windows; the main or root window being the desktop area, or primary display region.

During a session using a window-based information system, many windows can be open at one time with many displayed icons within. Windows may overlap and partially, or entirely, hide other windows or icons. What results is that the particular information the user wants to obtain may be hidden behind several layers of windows and may be difficult to access; when an icon is hidden by another window it is temporarily not accessible. This has been referred to in the industry as the "window overlap" problem. There are several instances where window overlap problems routinely arise in the usage of conventional user interfaces. A few of the more troublesome scenarios are described below.

In order to complete a task, often the user must access a' single icon within an open window that exists in the background, that is, covered or partially covered by other windows. The desired icon ("target" icon) within the window is no longer visible, and therefore not presently accessible. The overlapping windows or those that lay "on top of" the target window must be closed or moved away ("shuffled") so that the target window and target icon are visible and thus accessible. Window shuffling is time consuming, confusing and often very tedious for the user. If multiple routine icons need to be systematically accessed in sequence then multiple window shuffling procedures may be required.

Another window overlap problem plaguing conventional user interfaces arises when the user requires two icons to complete a task and each icon is within a different window. The resulting screen display may contain several open windows from past tasks that may clutter the screen display with unwanted information. This information may obscure the desired windows and icons. In many instances the overlapping windows are not unwanted, but hold the first of the desired icons in displayable view. In order to access the second desired icon, the user may close the overlapping window that holds the first icon, then gain access to the second desired icon. Since the previously closed window holds the first desired icon it must be opened again so that the present task can be completed. Again, this process is often time consuming and confusing for the user—especially when the hidden second icon is one that is routinely required. In this case the user is engaged in constant "window shuffling" as described above.

Not surprisingly, these types of problems have received a significant amount of attention in recent years. Several user interface products have been developed which provide different solutions to the manner in which frequently used and currently active desktop objects are handled by the GUI. For example, consider the conventional GUI depicted in FIGS. 1(a) and 1(b). Therein, a "Desk Drawer" concept is implemented to provide selectively hideable access to frequently used desktop objects. FIG. 1(a) depicts the screen 75 having a desktop area 20 with the Desk Drawer closed, wherein only the handle 10 of the Desk Drawer is visible. An open window 60 containing several document icons 55-58 which are, therefore, accessible for operations by the user via cursor 50. The window 60 also includes a window title field 65 and window select region 74.

When activated, e.g., by placing cursor 50 over handle 10, the Desk Drawer "opens" to reveal its contents. In this case, icons 41, 42, 51 and 59 become visible. Now that these icons are visible, they too are available for manipulation by the user via cursor 50. Thus, the Desk Drawer concept provides a mechanism for placing frequently used icons in an out of the way, yet easily accessible location. The interested reader is directed to U.S. Pat. No. 5,657,049, entitled "Desk Drawer User Interface" for a more in depth discussion of this technique, the disclosure of which is incorporated here by reference.

Another conventional GUI, i.e., that provided with the WINDOWS 95 Operating System, tackles the problem of desktop clutter by the provision of a taskbar to organize concurrently running applications as shown in FIG. 2. Therein, the desktop window 200 includes a plurality of icons 210 as well as the taskbar 220. The icons 210 provide "shortcuts" to applications or documents which can be invoked, e.g., by "double-clicking" on the desired icon. The taskbar 220 identifies windows which are active including both those which are maximized and "minimized", i.e., are not currently displayed on the desktop 200. Each such active application is represented on the taskbar 220 by a corresponding button, which typically has an iconic representation of the application as well as some descriptive text. As new applications axe launched, representative buttons will be added to the taskbar 220, from left to right. Each existing button will be scaled in length to permit the taskbar to accommodate new buttons. To "maximize" an application residing on the taskbar 220, the user can single click on the representative button. Another feature sometimes seen in this type of conventional GUI are application bars, e.g., appbar 230. Appbar 230 typically includes a number of smaller buttons (relative to the length of buttons on the taskbar when only a few applications are resident there), which buttons can be depressed to launch a currently inactive application.

This conventional GUI, however, suffers from the drawbacks of having a rather rigidly structured layout (e.g., the user cannot select or organize the order of the buttons on the taskbar 220) and from difficulties in handling the representation of a large number of applications. As more buttons are added to the taskbar 220, each individual button becomes smaller. When, for example, between 20-30 applications have been launched and minimized, the taskbar 220 begins to add new buttons as a second layer rather than continuing the line of buttons illustrated in FIG. 2. To reach the second layer, the user must toggle the taskbar 220, i.e., not all of the buttons are visible simultaneously on the GUI. As the power of computers and number of interesting applications, documents and other objects increases, it is anticipated that users will wish to have ready access to a growing number of objects and, therefore, will find the approach depicted in FIG. 2 to be annoying and ineffective.

Another conventional GUI which attempts to solve this particular problem can be found in the NeXT™ Operating System. As illustrated in FIG. 3, and further described in U.S. Pat. No. 5,146,556, entitled "System and Method for Managing Graphic Images" (the disclosure of which is also expressly incorporated here by reference), this GUI provides an application "dock" 300 including a column of icons on the right side of the screen 310. The dock 300 is described as providing a visible mechanism for starting applications. Icons can be added and deleted to the application dock 300 by dragging them into a desired location proximate the docking area, at which time the operating system will integrate them into the dock 300.

Although somewhat more flexible in terms of allowing the user to organize its content than the taskbar/appbar of FIG. 2, the application dock 300 still suffers from its limitations in terms of the number of applications which can be docked at any one time. The icons in the dock are of a fixed size and, according to the user manual, are therefore limited to a maximum of 13 which can be included in the dock at any one time.

Thus, it can be seen that there remains a need in the art to design a GUI which provides the user with a larger degree of flexibility in terms of both the layout of the tool which manages these types of frequently used objects, as well as permitting a larger number of such objects to be managed and simultaneously displayed.

SUMMARY

According to exemplary embodiments of the present invention, these and other drawbacks and difficulties of conventional GUIs are overcome by providing a simple, consolidated and easily extensible facility for handling, for example, frequently used objects. For example, user interfaces according to the present invention provide a tool (referred to herein as the "userbar") which consolidates features including: launching and managing running applications; opening and managing documents and their associated windows; accessing control strip functionality; navigation to all types of uniform resource locators (URLs); and status and notification on running processes.

As mentioned above, existing tools of this type, such as taskbars and docks, are constrained in one or more of at least two ways: having a rigidly structured layout and being limited in the number of objects that they can represent in the available screen space. With respect to layout, the userbar according to the present invention is designed so that the organization of the userbar is in the hands of the user. For example, the tiles that represent the individual items in the userbar can be reorganized at will. There is virtually no structure enforced on the user, with the exception of two "bookends" which define boundaries of the facility.

With respect to screen space, the userbar according to the present invention provides a method for scaling the entire contents of the object handling facility such that literally upwards of fifty objects (or more) can be accommodated in a single, visible structure. As the objects handled by the userbar become rather small, e.g., due to the size set by the user or due to a large number of objects being added thereto, it naturally becomes more difficult to distinguish between different tiles. Accordingly, exemplary embodiments of the present invention provide a magnification effect, also referred to herein as a fisheye effect, for browsing the scaled contents of the userbar. This mechanism allows specified contents of the userbar, in particular minimized windows, to be presented at a larger size and in greater detail and legibility than other objects in the userbar. This feature permits, among other things, the individual tiles of the tool to retain their legibility and prevents the user interaction with the tool from being compromised by the scaled contents.

BRIEF DESCRIPTION OF THE DRAWINGS

These and other objects, features and advantages of the present invention will be readily understood by those skilled in the art by reading the following detailed description in conjunction with the drawings, in which.

DETAILED DESCRIPTION

In the following description, for purposes of explanation and not specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1A:
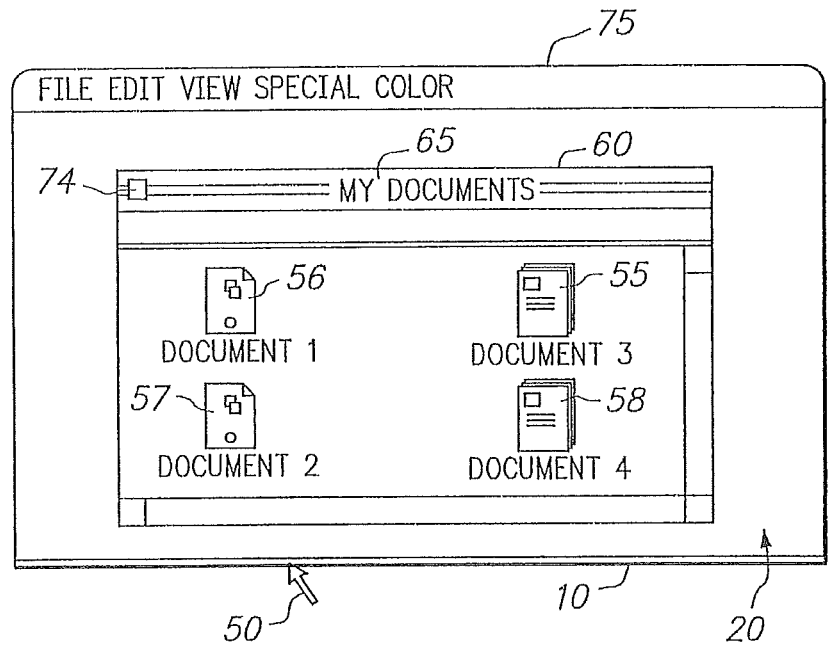
FIGS. 1(a) and 1(b) depict a first, conventional user interface.
Figure 1B:
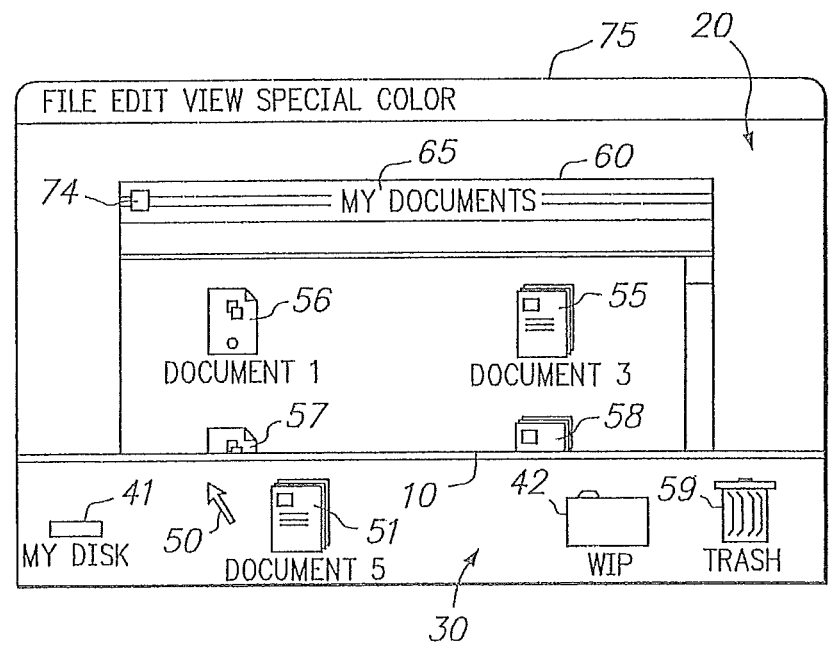
Figure 2:
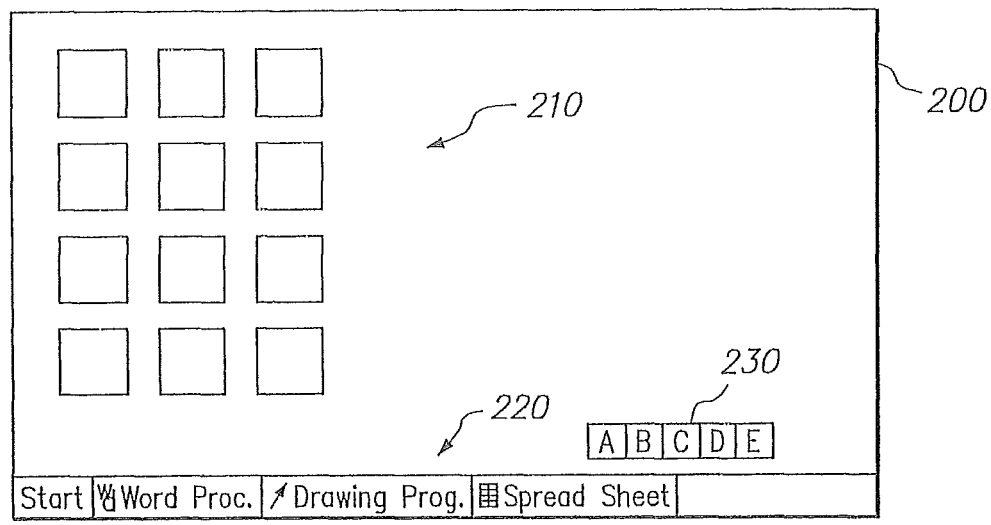
FIG. 2 depicts a second, conventional user interface which employs a taskbar and an appbar to handle objects.
Figure 3:
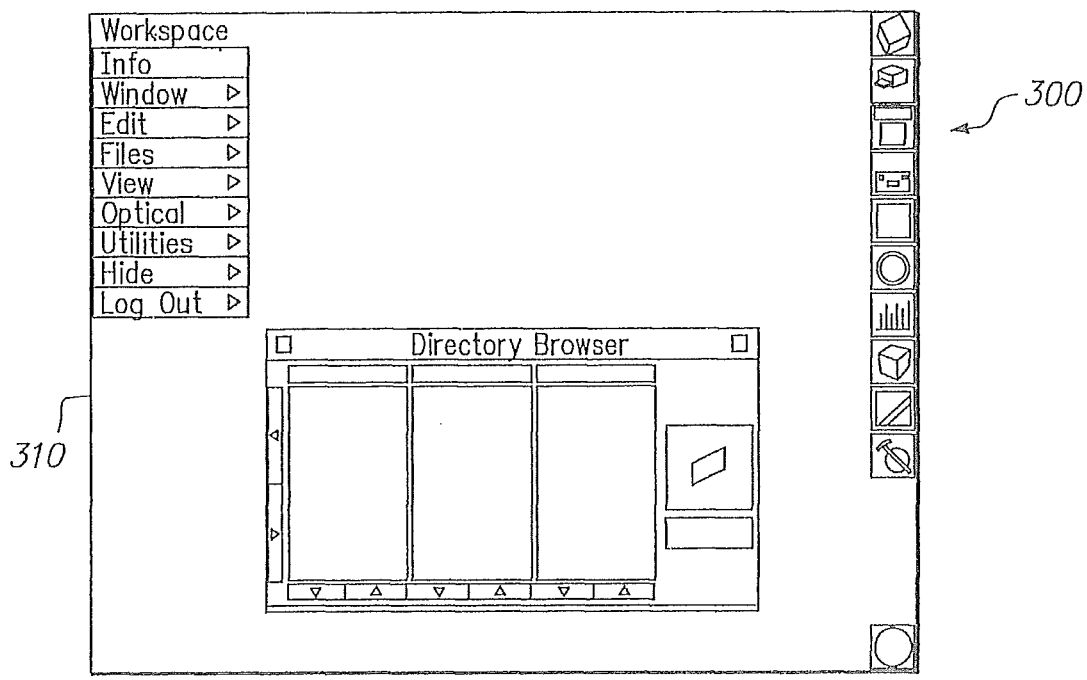
FIG. 3 depicts a third, conventional user interface which employs an application dock.
Figure 4:
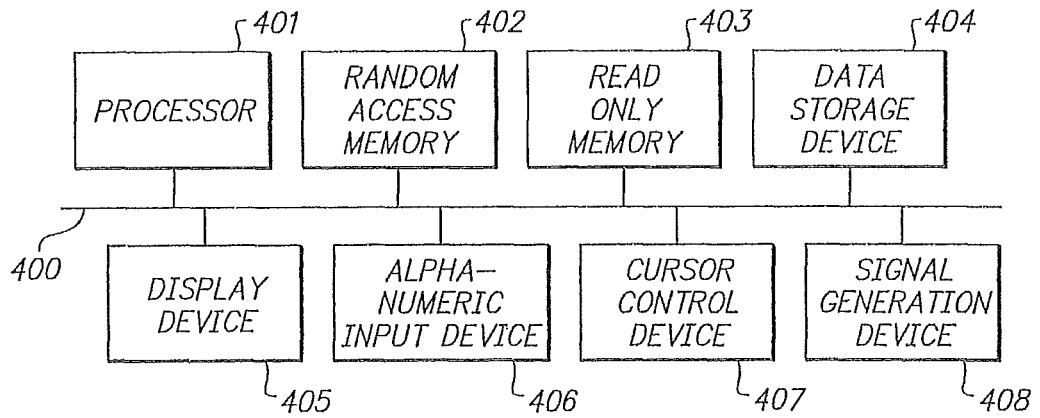
FIG. 4 is a block diagram of an exemplary system in which the present invention can be implemented.

Exemplary embodiments of the present invention can be implemented on an Apple Macintosh™ computer system using the Finder™ user interface. However, it will be readily appreciated by those skilled in the art that user interfaces and elements of user interfaces according to the present invention can be used in combination with any system having a processor and a display. In general, such computer systems, as illustrated in block diagram form by FIG. 4, comprise a bus 400 for communicating information, a processor 401 coupled with the bus for processing information and instructions, a random access memory 402 coupled with the bus 400 for storing information and instructions for the processor 401, a read only memory 403 coupled with the bus 400 for storing static information and instructions for the processor 401, a data storage device 404 such as a magnetic disk and disk drive or CD ROM drive coupled with the bus 400 for storing information and instructions, a display device 405 coupled to the bus 400 for displaying information to the computer user, an alphanumeric input device 406 including alphanumeric and function keys coupled to the bus 400 for communicating information and command selections to the processor 401, a cursor control device 407 coupled to the bus for communicating information and command selections to the processor 401, and a signal generating device 408 coupled to the bus 400 for communicating command selections to the processor 401.

The display device 405 utilized with the computer system and the present invention may be a liquid crystal device, cathode ray tube, or other display device suitable for creating images and alphanumeric characters (and ideographic character sets) recognizable to the user. The cursor control device 407 allows the computer user to dynamically signal the two dimensional movement of a visible symbol (cursor) on a display screen of the display device 405. Many implementations of the cursor control device are known in the art including a trackball, mouse, joystick or special keys on the alphanumeric input device 406 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled. In the discussions regarding cursor movement and/or activation within the preferred embodiment, it is to be assumed that the input cursor directing device or push button may consist any of those described above and specifically is not limited to the mouse cursor device.

Figure 5:
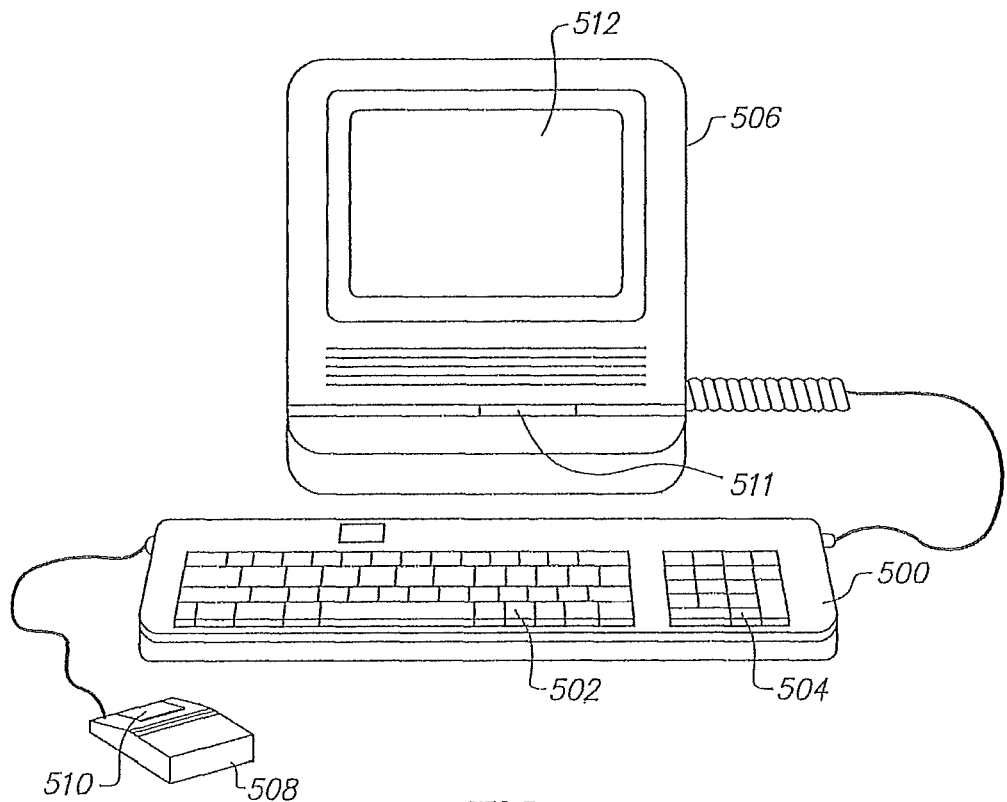
FIG. 5 is an exemplary computer system which may contain the functional blocks of FIG. 4 and in which the present invention can be implemented.

FIG. 5 illustrates an exemplary computer system that in which the present invention can be implemented. It will be appreciated that this computer system is one of many computer systems that may can include the present invention. Therein, a keyboard 500 with keys 502 and keypad 504 is attached to the computer 506 along with a mouse device 508 and mouse push button(s) 510 for controlling the cursor. The mouse device 508 and push button 510 make up a cursor control device 407. It will be appreciated that many other devices may be used as the cursor control device 407, for instance the keyboard 500 may be substituted for the mouse device 508 and button(s) 510 as just discussed above. The computer 506 also typically contains a one or more media drives 511 (e.g., floppy disk, hard disk or CD ROM) and a display screen 512.

Having described exemplary computer systems in which user interfaces according to the present invention can be implemented, the discussion now turns to a description of such user interfaces. According to exemplary embodiments of the present invention, a userbar is provided to the user interface which solves many of the problems described above with respect to conventional user interface tools and facilities by providing extensibility, scalability and flexibility which are lacking in prior systems.

Userbar Contents

Figure 6:
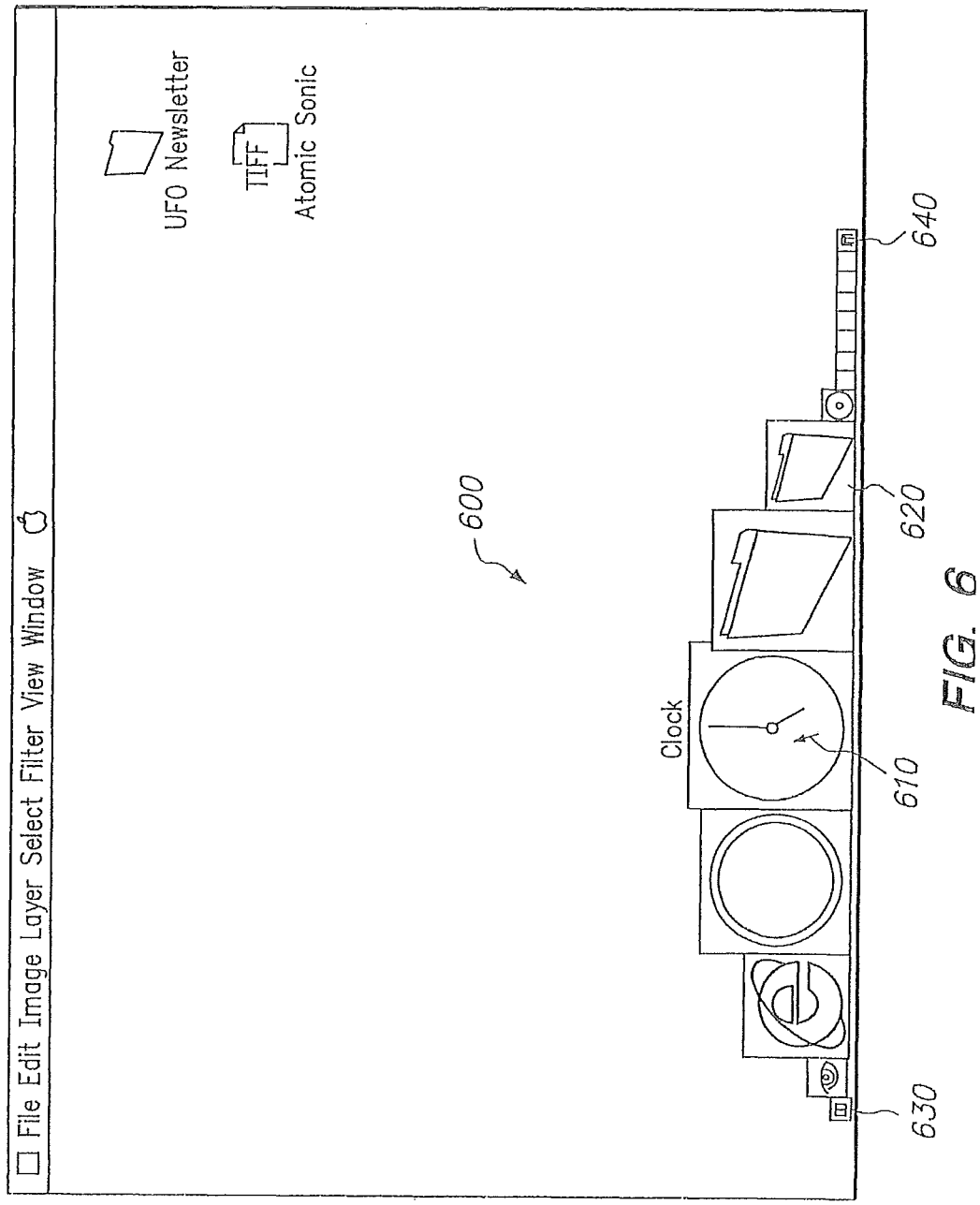
FIG. 6 illustrates a user interface including a userbar according to an exemplary embodiment of the present invention.

An example of the userbar according to the present invention can be seen in the user interface of FIG. 6. Other examples are seen in subsequent figures which will be further described below. Therein, the userbar 600 includes a number (in this example sixteen) of tiles aligned along a bottom portion of a user interface, the magnification level of which varies based on the position of the cursor 610 in a manner to be described below in the section entitled "Userbar Appearance". The contents of the userbar 600 may represent a user-selected (or alternatively, an application or operating system selected) set of "super-favorite" items, i.e., items that the user has determined deserve greater ease-of-access than their broader collection of favorite items, which could be numerous. The straightforward configuration mechanism of the userbar 600 according to the present invention facilitates frequent changes to its contents, which contents are based on a user's preferences and will, therefore, naturally vary from one user to the next. Any type of item or object may be handled by the userbar 600, however a few examples, including applications, document files and windows will now be described in order to illustrate how exemplary userbars according to the present invention may represent and manipulate various items.

Applications can be presented on the userbar 600 by, for example, one of two methods. First, the application's icon can be added to the userbar 600 as a permanent fixture, e.g., for most frequently launched applications. Alternatively, the application may not be a permanent fixture of the userbar 600, but may be added thereto because it is currently running. Such non-permanent applications may be represented in the userbar 600 only while the application remains running and may be removed automatically by the GUI when the application is terminated. Faceless background applications, e.g., virus protection applications, if not launched from the userbar 600, need not be represented on the userbar 600 while they are running. Similarly, application sub-processes, such as a Finder copy, need not appear as a separate application tile on the userbar 600.

Document files can also be placed on the userbar 600. This includes, for example, editable, non-editable (i.e., read only) and stationary files. An application's "set" files (e.g., Location Manager sets) can also be placed on the userbar 600, but may only be useful to the user as part of the userbar 600 if selecting one of these tiles would initiate a set change. A user may choose to place multiple copies of a document onto the userbar 600, but the userbar 600 will preferably only include a single representation of each object in a particular state. For example, if a tile representing a folder is disposed on the userbar 600 and the user opens that folder, this can result in the file management system (e.g., Finder) opening (or navigating to) the directory represented by the folder. If the user then minimizes that file management system window, the originating userbar object is then presented on the userbar 600 as a minimized window (e.g., as a folder icon). Likewise, if a document is opened from the userbar 600 and its window is subsequently minimized by the user, it is preferable that a representation of the minimized window replace the image used for the originating document's tile, rather than adding a second tile to the userbar 600 for that object.

Document windows, when minimized by the user, are placed on the userbar 600 and remain there until either closed or maximized, which process is described in more detail below under the section entitled "Userbar Functionality". The image appearing on the tile can be, for example, either: 1) a dynamically scaled representation of the actual window contents, or 2) an appropriate image provided by, for example, the application, such as the window's proxy icon. For example, a minimized Finder window might more appropriately be presented as a folder icon, e.g., icon 620 in userbar 600, as opposed to providing a scaled image of the Finder window's content on the userbar 600.

In addition to applications, documents and windows, many other types of items may reside on userbar 600. For example, any type of system-supported uniform resource locator (URL) file types can be placed on the userbar 600 including, but not limited to, file types having the extensions: http, ftp, news, mailto, at, afp and file. Additionally, developer-defined preference or setting modules (e.g., a slider control to adjust the computer's speaker volume) can be added to the userbar 600 by the user. Adding such preference or setting modules to the userbar 600 may be accomplished by, for example, dragging pre-defined objects from the Finder to the bar.

According to exemplary embodiments of the present invention, two items are permanent fixtures of the userbar 600. These items, denoted by reference numerals 630 and 640, act as "bookends" that contain the contents of the userbar 600 between them. Those skilled in the art will appreciate that the selection of specific tiles to act as bookends may vary from implementation to implementation of the present invention. However, in the purely illustrative exemplary embodiments described herein the 630, which represents the Finder process and its window list, is provided as the left bookend of the userbar 600. This the 630 represents the running Finder process and, according to this exemplary embodiment, no other tiles may be placed on the userbar 600 to the left of this object. Similarly, a tile 640 representing the trash object acts as the right bookend of the userbar 600 in this exemplary embodiment. This the may replace any other iconic representation of the trash object on the desktop GUI. Acting as the right bookend, the user will not be able to place any other tiles on the userbar 600 to the right of this object.

In addition to the two exemplary, permanent fixtures on the userbar 600 represented in this example by tiles 630 and 640, other predefined content may be placed on the userbar 600 at either the user's discretion or in a manner which is predefined by the GUI. Candidate items for such permanent residency on the userbar 600 include, for example, application folders, favorites, address book, clock, web browser and e-mail applications.

Userbar Appearance

Exemplary embodiments of the present invention provide various mechanisms which impact the appearance of the userbar 600 in a manner which is intended to aid in achieving the aforementioned objectives of providing a simple, consolidated and easily extensible facility for handling frequently used objects. The userbar 600 can be implemented as a single horizontal row of items, or "tiles", each of which represent a particular object or process. Any state which is supported for each object or process in the operating system should also be supported on the userbar 600 by providing a different appearance for each state. For example, a tile disposed in userbar 600 can change its appearance as it moves from one state, e.g., selected, to another state, e.g., open or offline. This allows the user to quickly recognize the current state of each of the items on the userbar 600. Currently executing applications can be indicated by, for example, placing an LED-like indicator graphic above or below the corresponding application's tile or icon. Applications can also supply additional tile images to be substituted for, or composited on, the running application's tile in the userbar 600. For example, an e-mail application's tile can present the number of new messages, superimposed over the application's icon.

According to exemplary embodiments of the present invention, the default position of the userbar 600 is anchored to the bottom of the main monitor and centered horizontally therein. Thus, the userbar 600 maintains a position aligned relative to the horizontal center of the screen, regardless of the number of items or tile placed in the userbar 600. Depending upon the desired implementation, the user may or may not be permitted to relocate the userbar 600 from its default position.

In terms of the size of the userbar 600, according to this purely illustrative exemplary embodiment, the userbar 600 has a default size of 64×64 pixels. This default height may change at locations associated with the cursor position as described below in the section entitled "Variable Magnification of Userbar Tiles". A gap of a few pixels may be provided between the bottom of the userbar 600 and the bottom of the screen to allow windows that are placed, or dragged, below the height of the bar to remain partially visible. Alternatively, the userbar may be provided at the very bottom of the display space such that no gap exists. In fact, the userbar 600 may be located in any desired space on the display.

The userbar 600 is, according to these exemplary embodiments, the topmost window on the screen, i.e., all other windows appear behind the userbar 600. Applications, when creating or zooming document windows, should place the bottom of the document window above the top of the bar so as not to obscure any portion of the window with the userbar 600 which would otherwise overlay the newly created window.

Each tile can have a label associated therewith. For example, in FIG. 6 the label "Clock" can be seen centered above tile 610. Those skilled in the art will appreciate that the label could alternatively be displayed below the corresponding tile. According to exemplary embodiments of the present invention, labels for each tile are only visibly displayed on the monitor while the cursor is proximate the corresponding tile. For example, as the cursor moves into a region associated with a particular tile, the label associated with that the is displayed. When the cursor moves out of this region, the tile label will vanish. Tile labels, when made visible or invisible, can do so in a manner which makes them appear to fade in or fade out. In current embodiments of the present invention, when the cursor 610 enters the userbar region, a fade in time of zero milliseconds is provided, although those skilled in the art will appreciate that this value may be changed. In fact, the fade in and fade out values mentioned herein may be user changeable, e.g., using the user preferences dialog box described below with respect to FIG. 7.

As the cursor 610 continues to roll across tiles on the userbar 600, the appropriate tile label fades in while the previous tile label fades out. Current embodiments of the present invention provide, however, provide a value of zero milliseconds for fading in and fading out of the tile labels as the cursor moves across the userbar 600. If the cursor 610 leaves the userbar 600, the last label presented persists for a short period, e.g., 250 milliseconds, then fades out. Although this exemplary embodiment of the present invention is described in the context of only displaying a single label at a time, those skilled in the art will appreciate that this feature of the present invention may be readily adapted to varying implementations. For example, the tile labels associated with the current tile over which the cursor is positioned, as well as the two tiles to either side of the current tile, could be simultaneously displayed. Again, the number of the labels being displayed may be user settable.

According to another exemplary embodiment of the present invention, in order to assist the user in managing the userbar's contents, separator tiles can be provided. These colored or translucent separator tiles can be placed between existing tiles to provide a visual distinction between groups of tiles. For example, the separator tiles may be provided as a half-width tiles (e.g., 32 pixels) and/or quarter-width tiles (e.g., 16 pixels).

Variable Magnification of Userbar Tiles

As mentioned above, a significant benefit of the present invention may be found in the ability to permit a large number of tiles to reside in a single row of the userbar 600. Of course, the number of tiles which can fit in the userbar 600 in a single row is dependent upon the screen size and the size of each individual tile. Since screen sizes are fixed, the only way to increase the number of tiles in the userbar 600 is to reduce their size. However, at some relatively small size, the images in each the will not be distinguishable by the user. Exemplary embodiments of the present invention address this problem by providing for variable magnification levels as between different tiles on the userbar 600.

Referring again to the exemplary embodiment illustrated in FIG. 6, it will be seen that a cursor 610 rests on top of one tile in the userbar 600, i.e., the tile having the descriptive legend "Clock" thereabove. It will immediately be recognized that the "Clock" tile on which the cursor 610 rests has been magnified to be larger than the surrounding tiles in the userbar 600. This magnification is attributable to the "fisheye" effect which can be provided to the userbar 600 according to exemplary embodiments of the present invention.

In this particular exemplary embodiment, not only is the tile upon which cursor 610 rests magnified, but so are surrounding tiles. The amount of magnification can vary as between tiles proximate the cursor position. In this example, the magnitude of the magnification level is a function of the distance of each tile edge from the cursor 610. Of course those skilled in the art will appreciate that there are many different types of magnification techniques and algorithms which can be employed to provide this type of functionality. For example, any number of tiles to either side of that over which the cursor is resting could experience some level of magnification. Alternatively, only the individual tile over which the cursor is resting can be magnified. The level (percentage) of magnification of each tile can also be varied in any desired manner.

At a more fundamental level, however, it will be appreciated that this magnification permits one or more selected tiles in the userbar 600, i.e, the tile which is pointed to by the cursor 610 as well as tiles proximate to the cursor 610, to be readily viewed and identified even while other tiles residing in the userbar 600 are possibly more difficult to distinguish. This magnification functionality, among other techniques associated with user interfaces according to the present invention, permits the userbar 600 to, on the one hand, handle many more objects than was possible in conventional user interfaces in a single, simultaneously viewable manner while, on the other hand, allowing the user to readily identify and manipulate individual objects residing on the userbar.

Figure 7:
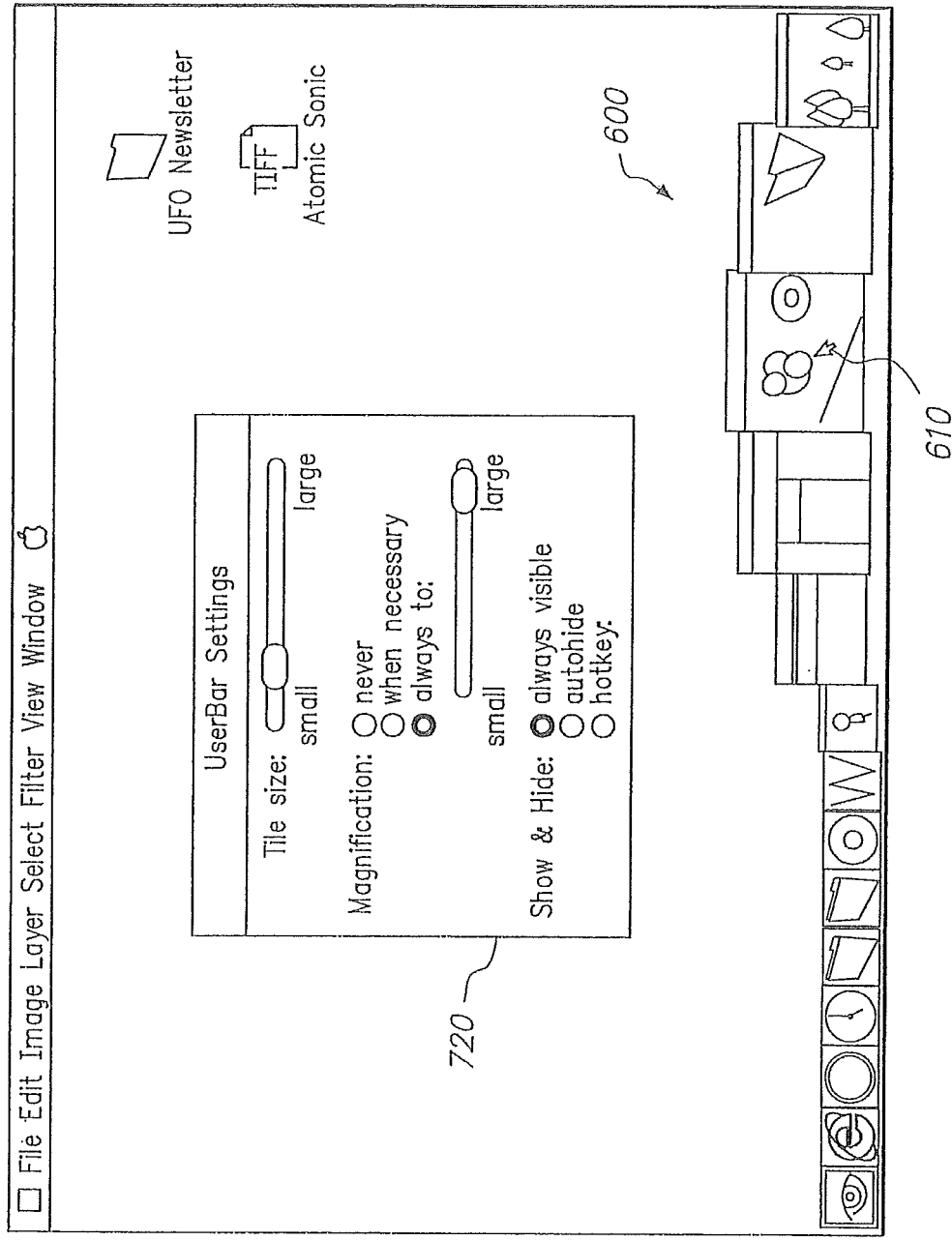
FIG. 7 depicts the user interface of FIG. 6 with the cursor disposed at another location within the userbar region on the screen.

As the cursor 610 moves over the userbar 600, certain tiles experience increased magnification, while other tiles' magnification decreases, based on their relative distance to the current cursor position. Compare, for example, FIG. 7 with FIG. 6. Although these two figures depict the same userbar 600, i.e., with the same tiles residing therein, the magnification characteristics differ. In FIG. 7, the cursor 610 now rests over the tile entitled "8". Some of the tiles surrounding "8" are also magnified, while the "Clock" tile has returned to its unmagnified state and is now displayed at a default size setting. The magnification effect can be canceled when the cursor leaves the content region of the userbar 600, as determined by the level of magnification being applied (which level is user-selectable as described below). For example, if the default size of the tiles is 64 pixels, but the tile on which the cursor is currently positioned has been scaled up to 128 pixels due to the magnification effect, then this effect will not end until the cursor leaves the 128 pixel top boundary of the userbar 600.

Also seen in FIG. 7 is an exemplary userbar settings screen 620 which permits the user to vary the tile size, magnification characteristics and the show/hide characteristic of the userbar. This feature of exemplary user interfaces according to the present invention will be described in more detail below.

Figure 8A:
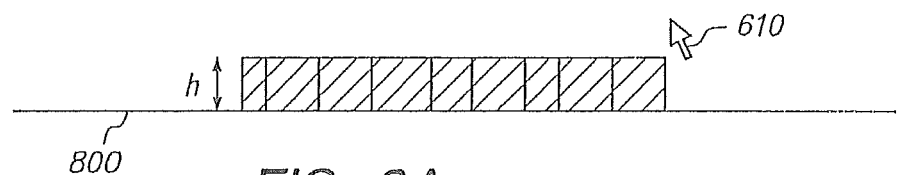
FIGS. 8(a)-8(d) describe an exemplary magnification effect mechanism according to an exemplary embodiment of the present invention.

With reference now to FIGS. 8(a)-8(d), a more detailed example of a variable magnification function according to the present invention will now be described. Therein, each tile is placed along a reference baseline 800 (which may be located in any position and with any orientation on the display). As seen in FIG. 8(a), each the has the same height h, but may have different widths. FIG. 8(a) shows the default display state of a group of tiles residing in userbar 600 when the cursor 610 is outside of the userbar region, i.e., the variable magnification effect has not been invoked.

Figure 8B:
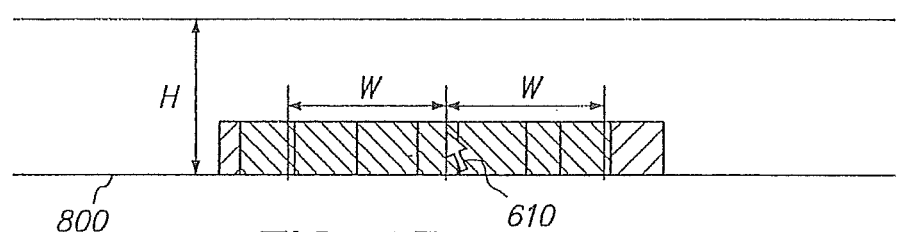

To establish the variable magnification function, a scaling height H and an effect width W are chosen. Either, both or neither of these parameters may be user settable. For example, the user preferences dialog box 720 in FIG. 7 provides an example wherein the user can select the scaling height H via a slider. The effect width defines a region wherein any tile that lies even partially within W pixels to either side of the cursor position within the userbar region will be scaled. For example, as shown in FIG. 8(b), the darker tiles will be scaled based on the cursor 610's position, while the lighter tiles on either end of the userbar 600 will not be scaled. The parameter W can be chosen to be a multiple of the default tile width, however such a relationship is not required.

After determining the effect region based on W and the cursor position, a scale amount S based on the effect width and change in height of the tiles is calculated according to equation (1).

$$S((H-h)\div 2)\div \mathrm{sine}(\pi\times(h\div 2)\pm(W\times 2)) \qquad (1)$$

Tiles outside the effect region will be shifted away from the cursor position by the scale amount S, resulting in the userbar 600's width increasing by up to 2S.

Figure 8C:
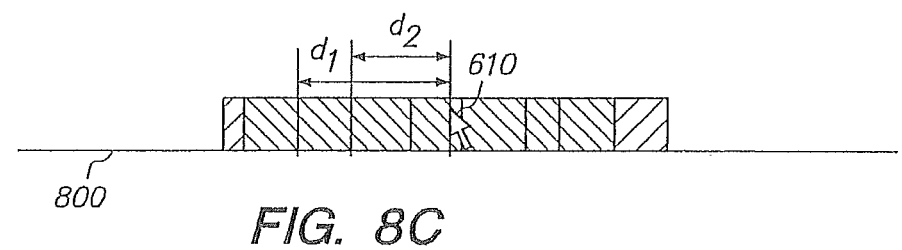
Figure 8D:
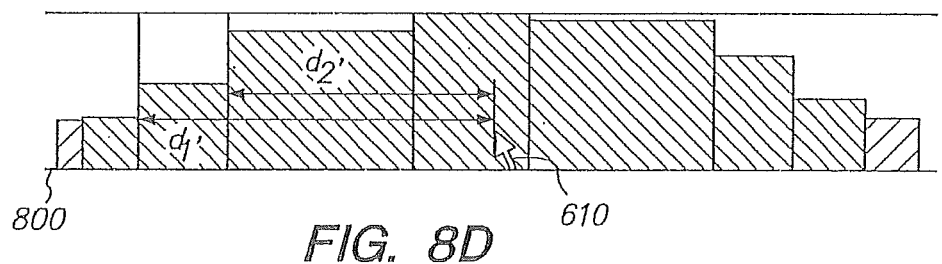

When the cursor 610 enters the userbar region, two distances ($d_1$ and $d_2$) are calculated for each tile. More specifically, for each tile the distance $d_1$ from the cursor 610's position to the left edge of tile and the distance $d_2$ from the cursor to the right edge of the tile are calculated as seen in FIG. 8(c). If the value of either $d_1$ or $d_2$ lies outside the range {−W, W}, then the value is changed to be the closest of −W and W. Scaled values $d_1'$ and $d_2'$ are then calculated using the following sine functions:

$$d_1'=S\times \mathrm{sine}(\pi\div 2\times d_1\div W) \qquad (2)$$

$$d_2'=S\times \mathrm{sine}(\pi\div 2\times d_2\div W) \qquad (3)$$

Each tile is then redrawn between $d_1'$ and $d_2'$ having a size which is scaled equally in both width and height from the lower left hand corner by a factor:

$$1+(d_2'-d_1')\div(d_2-d_1) \qquad (4)$$

Those skilled in the art will appreciate that the foregoing is merely an illustrative example of a particular, yet still exemplary, embodiment by which a variable magnification effect according to the present invention can be implemented. Moreover, although these exemplary embodiments describe user interfaces wherein the variable magnification effect is invoked when the cursor moves into the userbar 600 region, i.e., when the cursor crosses a border of one of the tiles residing in the userbar 600, those skilled in the art will further appreciate that the magnification effect can also be invoked earlier, e.g., when the cursor moves to within some predetermined distance of one of the tile borders.

Userbar Functionality

Having described examples of userbar contents and appearance according to exemplary embodiments of the present invention, the discussion now turns to exemplary techniques in which the userbar 600 can be implemented to provide desirable user interface functionality. According to one exemplary embodiment of the present invention, the userbar 600 is not implemented as a container and, therefore, it cannot "hold" file system objects. Therefore, an object placed on the userbar 600 by the user can be implemented as an alias to the corresponding file system, or source object. This means that, for example, moving objects from the userbar to the trash 640 will not result in the source file being destroyed.

The userbar 600 according to the present invention has many functions and features including launching, navigation and process management. The userbar 600 can also support drag launching and storage, e.g., the ability to open or store a document by dragging it to an application or folder, respectively, that resides on the userbar 600 as a tile.

As a navigator, the userbar 600 provides a method for users to easily access, or navigate to, favorite "places", including but not limited to windows. For example, according to exemplary embodiments, all system-supported universal resource locators (URLs), as well as local or remote directories, can be placed on the userbar 600. However in the context of windows, minimized windows can be scaled and added to the userbar 600. Minimized windows can be presented on the userbar 600, for example, as either thumbnails of their content or by their window proxy icon. For example, the minimized window of a Finder's view of a folder may be more appropriately shown as the folder icon rather than a thumbnail of the window's content. Applications' icons on the userbar 600 can provide a contextual menu of their open document windows, thereby allowing users to select a specific window to bring to the front.

As a process manager, the userbar 600 provides a method for users to identify and switch between running applications. For example, the userbar 600 will permit users to hide/unhide processes and perform other such actions through contextual menus or modified mouse clicks. An application's status, e.g., not running, launching, running and running but hidden, can also be indicated by the userbar 600, e.g., by changing an appearance, behavior or other characteristic of the application's representative tile on the userbar 600. An application can update its status on the userbar 600, resulting in a change in the appearance or behavior of its representative tile. For example, a tile representing an e-mail application that is resident on the userbar 600 can be overlaid with a number representing the number of new messages in a user's inbox. This number can be updated and changed to reflect changes in the status of the in-box, e.g, increasing as new messages are received in the inbox or decreasing after the user reviews his or her messages.

In operation, according to this exemplary embodiment, all running applications will appear on the userbar 600. When launched, these applications will place their tiles to the immediate right of the left bookend tile 630. If the tile is left untouched while the application is running, then that tile will disappear from the userbar 600 once the application is quit. If the user changes the position of the application tile in the userbar 600 while the application is running, then the tile is designated as a permanent resident of the userbar 600 and does not disappear when it has finished running.

Items can be added to the userbar 600 by dragging them into the userbar's content region. During a drag, if the cursor 610 enters the region of the userbar 600, the userbar 600 will expand, e.g., at the nearest point between two existing tiles, to accommodate the item(s) being dragged. This permits new items to be inserted at any position in the bar. While expanded, tile images of the items being dragged can be visible in the bar in the positions they would occupy if dropped within the bar. These can be displayed as translucent "insert target tiles" to provide the user with an idea of how the userbar 600 would appear after dropping the items onto the userbar 600 at that position.

Having entered the userbar 600 during a drag, if the cursor 610 continues across the userbar 600, the insert target tile(s) move, following the horizontal position of the cursor 610. The position of the cursor 610, relative to the center-point of the underlying tile, is used to determine at what point the existing tile and insert target tiles swap positions. When item(s) are dropped, the actual tile image(s) representing the item(s) replace their respective translucent insert target tile(s). An animation sequence may be displayed to reinforce this action.

The user can reorder, or reposition items on the userbar 600. As mentioned above, in this exemplary embodiment only two items, the Finder application tile 630 and the Trash tile 640 cannot be repositioned. Instead, these tiles remain as bookends, defining the boundaries of the userbar's contents. Reordering items can be implemented in a straightforward manner by dragging an item (tile) to a new position, with similar graphical feedback being provided as for the process of adding an item to the userbar 600. That is, when removed the tile image can be changed to its translucent insert tile image and, when reinserted into the userbar 600, the tile will reacquire the image associated with its current state. Multiple items can be repositioned at the same time if the user first selects a plurality of items in the userbar 600 prior to initiating a drag operation.

A selection of multiple tiles can be made by, for example, defining that performing a shift-click on a tile will only select that tile, with no further action occurring. If the user maintains the shift key in a depressed state, additional tiles can be selected. Subsequent dragging, initiated on one of the pre-selected tiles will affect all selected tiles. If a discontiguous selection of tiles is repositioned within the userbar 600, the selection will become contiguous after the drop.

Items can be removed from the userbar 600 by dragging them to the trash tile 640, or to the desktop. The trash tile 640 will provide appropriate drop feedback (e.g., sound and/or animation) when an item is dragged thereover. As mentioned above, since the userbar 600 is preferably not a container which holds original source identifiers, but instead only aliases (i.e., pointers), this operation will only delete the userbar representation of the item and not the source object in the operating system. Alternatively, as will be appreciated by those skilled in the art, the userbar 600 could also be implemented using real file system objects rather than aliases.

The userbar 600 can be implemented to permit the user to interact with the items resident thereon through, for example, a single mouse click. According to this exemplary embodiment, single-clicking on tiles resident in userbar 600 will produce the following results:
  On application tiles, this operation will launch the application.
  On a document tile, this operation will open the document with the appropriate application, launching the application if necessary.
  On a URL tile, this operation will cause the destination to be presented using the appropriate application.
  On a control strip, the module's interface (i.e. a menu) will be presented. Clicking outside of the interface will dismiss the interface.
  On a minimized window, this operation will cause the window to be maximized
The user can switch between running applications by clicking on the desired application tile. This will result in that application, and all of its associated windows, being brought forward in the window layering order.

In addition to drag and drop configuring of the userbar 600, users can drag and drop files, and other userbar items, onto tiles which reside on the userbar 600. For example, a document can be dragged and dropped onto a tile representing a word processing application in the userbar 600, resulting in the word processing application being launched and then opening the dropped document. Alternatively, a file can be dropped onto a folder residing on the userbar 600, resulting in the file being moved or copied to the target folder.

As will be appreciated by those skilled in the art, it is useful to provide a mechanism which permits the GUI to distinguish between an operation wherein a user is adding an item to the userbar 600 and an operation wherein a user is dropping an item onto an existing tile which is already resident on the userbar 600. According to exemplary embodiments of the present invention, a modifier key, pressed anytime during the drag but prior to the drop, will force a drop action in place of the normal insert action. This modifier acts as a toggle between insert mode and drop mode and, if released during the drag, a drop will result in an default insert instead. Toggling the state of the modifier key will result in the bar opening (to accept an insert) and closing. During a modified drag, eligible target tiles can be highlighted to denote that they can receive the object type being dragged. The user can continue to drag items across the userbar 600, effectively browsing for eligible targets.

The userbar 600 also provides a number of window management solutions that are intended to allow users to make better use of limited screen space. For example, according to exemplary embodiments of the present invention, the userbar 600 does not provide direct access to all open document windows as only minimized windows are to be placed on the userbar. Access to a document window menu associated with a tile resident on the userbar 600 can be provided in, for example, one of two ways. First, a sub-menu can be displayed relative to each application tile, the sub-menu listing all of that application's open documents. Second, a dedicated application tile can be added to the userbar 600 which tile provides a menu interface to all open document windows, grouped by their associated applications.

Userbar Customization

As shown in FIG. 7, exemplary embodiments of the present invention provide techniques and mechanisms which permit a user to adjust the manner in which the userbar 600 is displayed on the screen. In this example, a dialog box 720 is illustrated having a number of user settable preferences available therein. These preferences permit the user to tailor the appearance and behavior of the userbar 600 to suit his or her needs.

For example, as described above the default tile size of the bar may be 64×64 pixels. The default value refers to the size of a tile in its unmagnified state. However, this default value can be changed by the user, e.g., by adjusting the slider shown in FIG. 7, e.g., within a range of 16 to 128 pixels square. The preferences dialog box 720 may also contain a set of controls which permit the user to determine when the magnification effect will be invoked and the amount of magnification provided. In the exemplary preferences dialog box 720 illustrated in FIG. 7, a set of controls is provided for this purpose including a radio button group that permits the user to determine when the magnification effect will be invoked and a slider that allows the user to set the maximum magnification level, e.g., that associated with the tile over which the cursor 610 is currently positioned. Of course the size of the magnified tiles should not be less than the default size of the tiles and some upper limit may be desirable for the magnification, e.g., 128 pixels.

The userbar 600 can also support the ability to be hidden offscreen. The preferences dialog box 720 can include a control, e.g., a radio button group as shown in FIG. 7, that support, for example, three states (off, on and by hotkey) for the auto-hide feature. With auto-hide on, the userbar 600 will animate (e.g., slide) downwards, offscreen when the cursor 610 is no longer within the region of the userbar 600. Then, display space normally occupied by the userbar 600 is reclaimed and applications can be notified of this event. New or zoomed documents will then be sized by the notified applications to make use of this additional screen space. Moving the cursor 610 to the bottom of the display will reveal the userbar 600. If the option for hiding the userbar 600 using a hotkey is enabled, the userbar 600 can then be hidden or revealed by executing a user-definable key combination.

As mentioned above, some tiles on the userbar 600 may acquire permanent residency on the userbar 600 such that, for example, when the graphical user interface is initialized the permanent tiles are automatically displayed with the userbar's display region. The designation of tiles as permanent or non-permanent may also be controlled by the user through the preferences dialog box 720, e.g., by using a select/deselect permanent tiles function (not shown in FIG. 7) which permits a user to identify objects for designation as permanent and, optionally, to select an image for the corresponding tile to be located on the userbar 600.

The above-described exemplary embodiments are intended to be illustrative in all respects, rather than restrictive, of the present invention. For example, although the foregoing, illustrative embodiments of the present invention depict a userbar as being a row of tiles disposed along the bottom of a display or screen, those skilled in the art will appreciate that userbars according to the present invention may be displayed anywhere in the display space and with any orientation therein. Userbars according to the present invention can have any desired shape, e.g., they could be nonlinear shapes, or could be presented as multiple rows of tiles. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method, comprising:

displaying a user interface that includes an application icon region, wherein the application icon region includes a plurality of application icons including a first application icon for a first application and one or more other application icons for other applications, wherein selection of a respective application icon for a respective application that is not open will open the respective application; and while displaying the user interface that includes the application icon region and while the first application is hidden:

detecting a change in the state of the first application independently of a change in the state of the other applications that correspond to other application icons in the application icon region; and in response to detecting the change in the state of the first application, updating the appearance of the first application icon independently of the appearance of the one or more other application icons in the application icon region, wherein updating the appearance of the first application icon includes displaying an indicator graphic superimposed on the first application icon, wherein the indicator graphic represents the change in the state of the first application.

2. The method of claim 1, wherein displaying the indicator graphic includes composing a new image or a new graphic to represent the first application.

3. The method of claim 1, wherein displaying the indicator graphic includes displaying a numeric value associated with the first application.

4. The method of claim 1, wherein the first application icon corresponds to an electronic communication application, and the indicator graphic includes a number that represents a number of messages received by the electronic communication application.

5. The method of claim 4, wherein the change in state includes a change in the number of messages in an inbox of the electronic communication application and wherein the indicator graphic changes to reflect the change in status.

6. The method of claim 1, wherein the change in state of the first application includes changing first application from a hidden state to an unhidden state.

7. The method of claim 1, wherein the plurality of application icons are displayed in multiple rows of applications in the application icon region.

8. A computer system comprising:
    at least one processor;
    a display device; and
    at least one storage device comprising instructions, which when executed by the at least one processor, configure the at least one processor to:
        display, on the display device, a user interface that includes an application icon region, wherein the application icon region includes a plurality of application icons including a first application icon for a first application and one or more other application icons for other applications, wherein selection of a respective application icon for a respective application that is not open will open the respective application; and
        while the user interface that includes the application icon region is displayed and while the first application is hidden:
            detect a change in the state of the first application independently of a change in the state of the other applications that correspond to other application icons in the application icon region; and
            in response to the detection of the change in the state of the first application, update the appearance of the first application icon independently of the appearance of the one or more other application icons in the application icon region, wherein updating the appearance of the first application icon includes displaying an indicator graphic superimposed on the first application icon, wherein the indicator graphic represents the change in state of the first application.

9. The computer system of claim 8, wherein displaying the indicator graphic includes composing a new image or a new graphic to represent the first application.

10. The computer system of claim 8, wherein the operation to display the indicator graphic includes displaying a numeric value associated with the first application.

11. The computer system of claim 8, wherein the first application icon corresponds to an electronic communication application, and the indicator graphic includes a number that represents a number of messages received by the electronic communication application.

12. The computer system of claim 11, wherein the change in state includes a change in the number of messages in an inbox of the electronic communication application and wherein the indicator graphic changes to reflect the change in status.

13. The computer system of claim 8, wherein the change in state of the first application includes changing first application from a hidden state to an unhidden state.

14. The computer system of claim 8, wherein the plurality of application icons are displayed in multiple rows of applications in the application icon region.

15. A non-transitory computer readable medium containing instructions that, when executed by a computing device, cause the computing device to perform operations including:
    displaying a user interface that includes an application icon region, wherein the application icon region includes a plurality of application icons including a first application icon for a first application and one or more other application icons for other applications, wherein selection of a respective application icon for a respective application that is not open will open the respective application; and
    while displaying the user interface that includes the application icon region and while the first application is hidden:
        detecting a change in the state of the first application independently of a change in the state of the other applications that correspond to other application icons in the application icon region; and
        in response to detecting the change in the state of the first application, updating the appearance of the first application icon independently of the appearance of the one or more other application icons in the application icon region, wherein updating the appearance of the first application icon includes displaying an indicator graphic proximate to the first application icon, wherein the indicator graphic represents the change in state of the first application.

16. The non-transitory computer readable medium of claim 15, wherein displaying the indicator graphic includes composing a new image or a new graphic to represent the first application.

17. The non-transitory computer readable medium of claim 15, wherein displaying the indicator graphic includes displaying a numeric value associated with the first application.

18. The non-transitory computer readable medium of claim 15, wherein the first application icon corresponds to an electronic communication application, and the indicator graphic includes a number that represents a number of messages received by the electronic communication application.

19. The non-transitory computer readable medium of claim 18, wherein the change in state includes a change in the number of messages in an inbox of the electronic communication application and wherein the indicator graphic changes to reflect the change in status.

20. The non-transitory computer readable medium of claim 15, wherein the change in state of the first application includes changing first application from a hidden state to an unhidden state.

21. The non-transitory computer readable medium of claim 15, wherein the plurality of application icons are displayed in multiple rows of applications in the application icon region.

* * * * *